(12) United States Patent
Lenahan et al.

(10) Patent No.: US 10,068,265 B2
(45) Date of Patent: Sep. 4, 2018

(54) CREATING REVENUE SOURCES USING ALLOCATION SOURCE

(75) Inventors: Michael Lenahan, Moraga, CA (US); Christen Ann Lenahan, Moraga, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 13/156,167

(22) Filed: Jun. 8, 2011

(65) Prior Publication Data

US 2011/0264503 A1 Oct. 27, 2011

Related U.S. Application Data

(63) Continuation-in-part of application No. 12/564,882, filed on Sep. 22, 2009.

(60) Provisional application No. 61/099,192, filed on Sep. 22, 2008.

(51) Int. Cl.
*G06Q 30/00* (2012.01)
*G06Q 30/06* (2012.01)
*G06Q 20/12* (2012.01)
*G06Q 20/28* (2012.01)
*G06Q 20/32* (2012.01)
*G06Q 30/02* (2012.01)
*G07F 17/30* (2006.01)

(52) U.S. Cl.
CPC ............ *G06Q 30/06* (2013.01); *G06Q 20/12* (2013.01); *G06Q 20/28* (2013.01); *G06Q 20/322* (2013.01); *G06Q 20/3274* (2013.01); *G06Q 30/02* (2013.01); *G06Q 30/0215* (2013.01); *G06Q 30/0226* (2013.01); *G06Q 30/0238* (2013.01); *G07F 17/305* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,594,226 A | * | 1/1997 | Steger | G06Q 20/042 235/375 |
| 6,006,207 A | * | 12/1999 | Mumick et al. | 705/38 |
| 6,199,048 B1 | * | 3/2001 | Hudetz | G06F 17/30879 235/462.01 |
| 6,594,640 B1 | * | 7/2003 | Postrel | 705/14.27 |
| 7,450,927 B1 | * | 11/2008 | Creswell et al. | 455/405 |
| 7,711,620 B2 | | 5/2010 | Abifaker | |
| 7,747,462 B2 | * | 6/2010 | Ohlsen et al. | 705/14.13 |
| 7,809,641 B2 | | 10/2010 | Sanders et al. | |

(Continued)

FOREIGN PATENT DOCUMENTS

| | | | | |
|---|---|---|---|---|
| WO | WO 99/66437 | * | 12/1999 | G06F 17/60 |
| WO | WO 02/086676 | * | 10/2002 | |

OTHER PUBLICATIONS

The examiner defines "presentation" as "offering, delivering, or bestowal, as of a gift." See Random House Dictionary, 2013 (attached).*

(Continued)

*Primary Examiner* — Peter Ludwig
(74) *Attorney, Agent, or Firm* — Maschoff Brennan

(57) ABSTRACT

Example methods, apparatuses, or articles of manufacture are disclosed herein that may be utilized, in whole or in part, to facilitate or support one or more operations or techniques for creating new and/or reoccurring revenue sources using an allocation source.

27 Claims, 23 Drawing Sheets

(56) References Cited

U.S. PATENT DOCUMENTS

| | | | |
|---|---|---|---|
| 7,850,079 B2* | 12/2010 | Lovegreen et al. | 235/383 |
| 7,953,654 B2 | 5/2011 | Abifaker | |
| 7,962,375 B2* | 6/2011 | Pappas et al. | 705/26.1 |
| 8,301,495 B2* | 10/2012 | Mason | 705/14.1 |
| 8,620,771 B2* | 12/2013 | Pappas et al. | 705/26.81 |
| 2001/0051915 A1* | 12/2001 | Ueno | G06Q 20/04 705/39 |
| 2002/0023027 A1* | 2/2002 | Simonds | G06K 7/1095 705/26.1 |
| 2002/0046255 A1* | 4/2002 | Moore et al. | 709/218 |
| 2003/0074311 A1* | 4/2003 | Saylors et al. | 705/39 |
| 2003/0101102 A1* | 5/2003 | Kim | 705/26 |
| 2003/0233276 A1* | 12/2003 | Pearlman | G06Q 20/3274 705/14.23 |
| 2004/0078332 A1* | 4/2004 | Ferguson | G06Q 20/04 705/41 |
| 2004/0111361 A1* | 6/2004 | Griffiths et al. | 705/39 |
| 2004/0186770 A1* | 9/2004 | Pettit et al. | 705/14 |
| 2005/0125292 A1* | 6/2005 | Kassab et al. | 705/14 |
| 2006/0111967 A1* | 5/2006 | Forbes | G06Q 30/02 705/14.26 |
| 2006/0190347 A1* | 8/2006 | Cuervo | 705/26 |
| 2006/0262914 A1* | 11/2006 | Cai | 379/114.16 |
| 2007/0174166 A1* | 7/2007 | Jones | 705/35 |
| 2007/0177824 A1* | 8/2007 | Cattrone | G06F 17/30011 382/306 |
| 2007/0250382 A1 | 10/2007 | Beck | |
| 2007/0267482 A1* | 11/2007 | Ruckart et al. | 235/380 |
| 2007/0288340 A1* | 12/2007 | Kravitz et al. | 705/36 R |
| 2008/0208689 A1* | 8/2008 | Johnson et al. | 705/14 |
| 2008/0215457 A1* | 9/2008 | Pappas et al. | 705/27 |
| 2008/0228643 A1 | 9/2008 | Hall | |
| 2008/0288340 A1* | 11/2008 | Pearson et al. | 705/14 |
| 2009/0012844 A1* | 1/2009 | Ohlsen et al. | 705/10 |
| 2009/0144161 A1* | 6/2009 | Fisher | 705/16 |
| 2010/0076877 A1 | 3/2010 | Lenahan | |
| 2010/0089992 A1* | 4/2010 | Kitada | G06Q 10/00 235/375 |
| 2010/0138344 A1* | 6/2010 | Wong | G06Q 20/10 705/44 |
| 2010/0241501 A1* | 9/2010 | Marshall | 705/14.13 |
| 2010/0287103 A1* | 11/2010 | Mason | G06Q 30/02 705/80 |
| 2010/0299195 A1* | 11/2010 | Nix et al. | 705/14.17 |
| 2010/0312629 A1* | 12/2010 | Wolf et al. | 705/14.27 |
| 2011/0235792 A1* | 9/2011 | Foster et al. | 379/114.2 |
| 2011/0238473 A1* | 9/2011 | Sankolli | G06Q 20/32 705/14.23 |
| 2012/0222081 A1* | 8/2012 | Schaefer | H04N 17/04 725/132 |

OTHER PUBLICATIONS

Eric Dash (2005). Capitalism at Work on Unwanted Gift Cirtificates. The New York Times.*

U.S. Appl. No. 12/564,882 Request for continued examination, dated Nov. 17, 2011, 17 pages.

U.S. Appl. No. 61/099,192, filed Sep. 22, 2008, 15 Pages.

Filing Receipt and Notice to File Missing Parts for U.S. Appl. No. 61/099,192, dated Oct. 21, 2008, 5 Pages.

Response to Notice to File Missing Parts for U.S. Appl. No. 61/099,192, filed Jan. 21, 2009, 6 Pages.

Updated Filing Receipt for U.S. Appl. No. 61/099,192, dated Jan. 28, 2009, 3 Pages.

Filing Receipt and Notice to File Corrected Application Papers for U.S. Appl. No. 12/564,882, dated Oct. 8, 2009, 5 Pages.

Notice of Publication of Application for U.S. Appl. No. 12/564,882, dated Apr. 5, 2010, 1 Page.

Response to Notice to File Corrected Application Papers for U.S. Appl. No. 12/564,882, filed Nov. 4, 2009, 3 Pages.

Resubmitted Response to Notice to File Corrected Application Papers for U.S. Appl. No. 12/564,882, filed Nov. 5, 2009, 3 Pages.

Updated Filing Receipt for U.S. Appl. No. 12/564,882, dated Nov. 13, 2009, 3 Pages.

Office Action for U.S. Appl. No. 12/564,882, dated Jan. 31, 2011, 29 Pages.

Response to Office Action for U.S. Appl. No. 12/564,882, filed May 2, 2011, 19 Pages.

U.S. Appl. No. 12/564,882, filed Sep. 22, 2009, 55 Pages.

U.S. Appl. No. 12/564,882 Non-Final Rejection, dated Sep. 13, 2012, 23 pages.

"Enterprise Rent-A-Car Partners with Discover® Card to Offer Consumers Double Cashback Bonus®", Business Wire. New York: Feb. 7, 2006. 3 pages.

"Hilton is expanding its program that allows guests to swap hotel points and airline miles", Levere, Jane L. New York Times. (Late Edition (East Coast)). New York, N.Y.: Mar. 27, 1996. p. D.5, 3 pages.

U.S. Appl. No. 12/564,882 Final Rejection dated Jun. 27, 2011, 24 pages.

"U.S. Appl. No. 13/156,167 Filing receipt and Notice to file corrected application papers dated Jun. 21, 2011", 5 pgs.

"U.S. Appl. No. 13/156,167 Response to notice to file corrected application papers dated Jul. 12, 2011", 6 pgs.

"U.S. Appl. No. 13/156,167 Updated filing receipt dated Jul. 20, 2011", 3 pgs.

"U.S. Appl. No. 12/564,882 , Response dated Jul. 15, 2013 to Final Office Action dated May 9, 2013", 14 pgs.

"U.S. Appl. No. 12/564,882, Final Office Action dated May 9, 2013", 26 pgs.

"U.S. Appl. No. 12/564,882, Non Final Office Action dated Sep. 16, 2013", 25 pgs.

"U.S. Appl. No. 12/564,882, Response dated Mar. 12, 2013 to Non Final Office Action dated Sep. 13, 2012", 14 pgs.

"U.S. Appl. No. 12/564,882, Response dated May 2, 2011 to Non Final Office Action dated Jan. 31, 2011", 17 pgs.

"U.S. Appl. No. 12/564,882, Response dated Nov. 17, 2011 to Final Office Action dated Jun. 27, 2011", 15 pgs.

Lenahan, Michael, et al., "Creating Revenue Sources Using Allocation Source", U.S. Appl. No. 13/156,167, filed Jun. 8, 2011, 103 pgs.

"U.S. Appl. No. 12/561,882; Response dated Jan. 16, 2014 to Non-Final Office Action dated Sep. 16, 2013", 14 pgs.

"U.S. Appl. No. 12/564,882, Advisory Action dated Jun. 27, 2014", 3 pgs.

"U.S. Appl. No. 12/564,882, Appeal Brief dated Sep. 18, 2014", 17 pgs.

"U.S. Appl. No. 12/564,882, Decision on Pre-Appeal Brief dated Aug. 11, 2014", 2 pgs.

"U.S. Appl. No. 12/564,882, Examiner's Answer dated Dec. 4, 2014", 11 pgs.

"U.S. Appl. No. 12/564,882, Final Office Action dated Mar. 18, 2014", 31 pgs.

"U.S. Appl. No. 12/564,882, Pre-Appeal Brief Request dated Jul. 18, 2014", 5 pgs.

"U.S. Appl. No. 12/564,882, Response dated Jun. 18, 2014 to Final Office Action dated Mar. 18, 2014", 17 pgs.

* cited by examiner

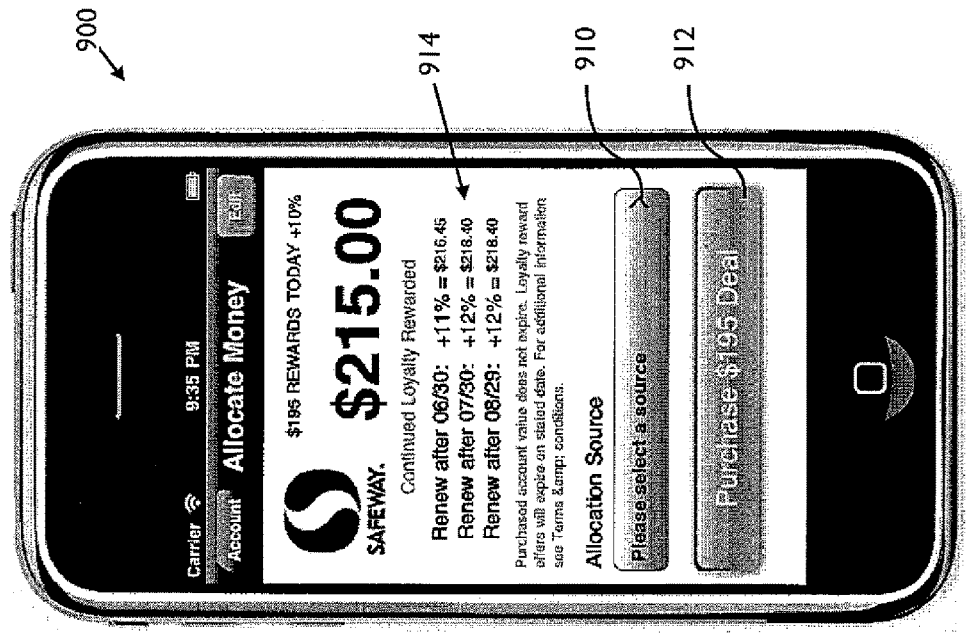
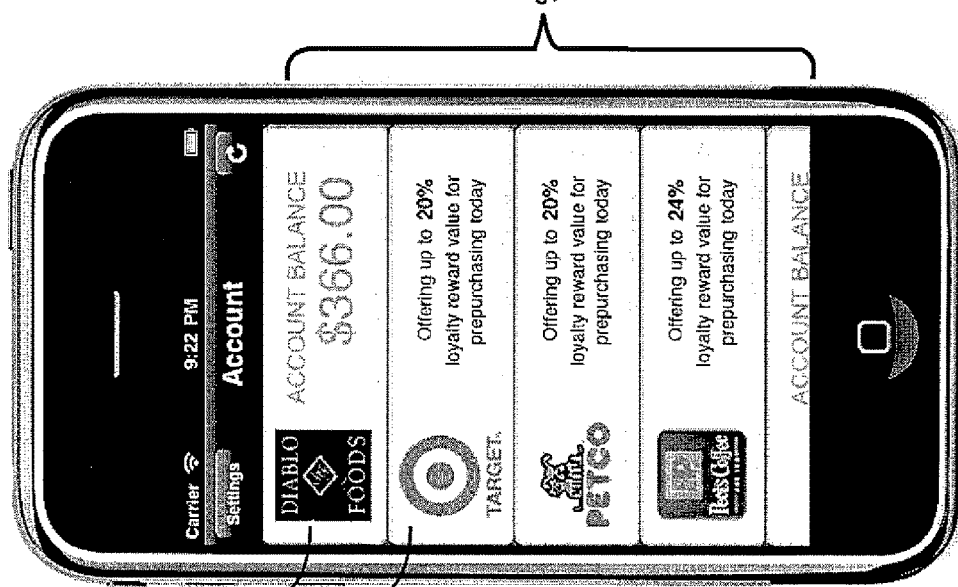
FIG. 9B
FIG. 9A

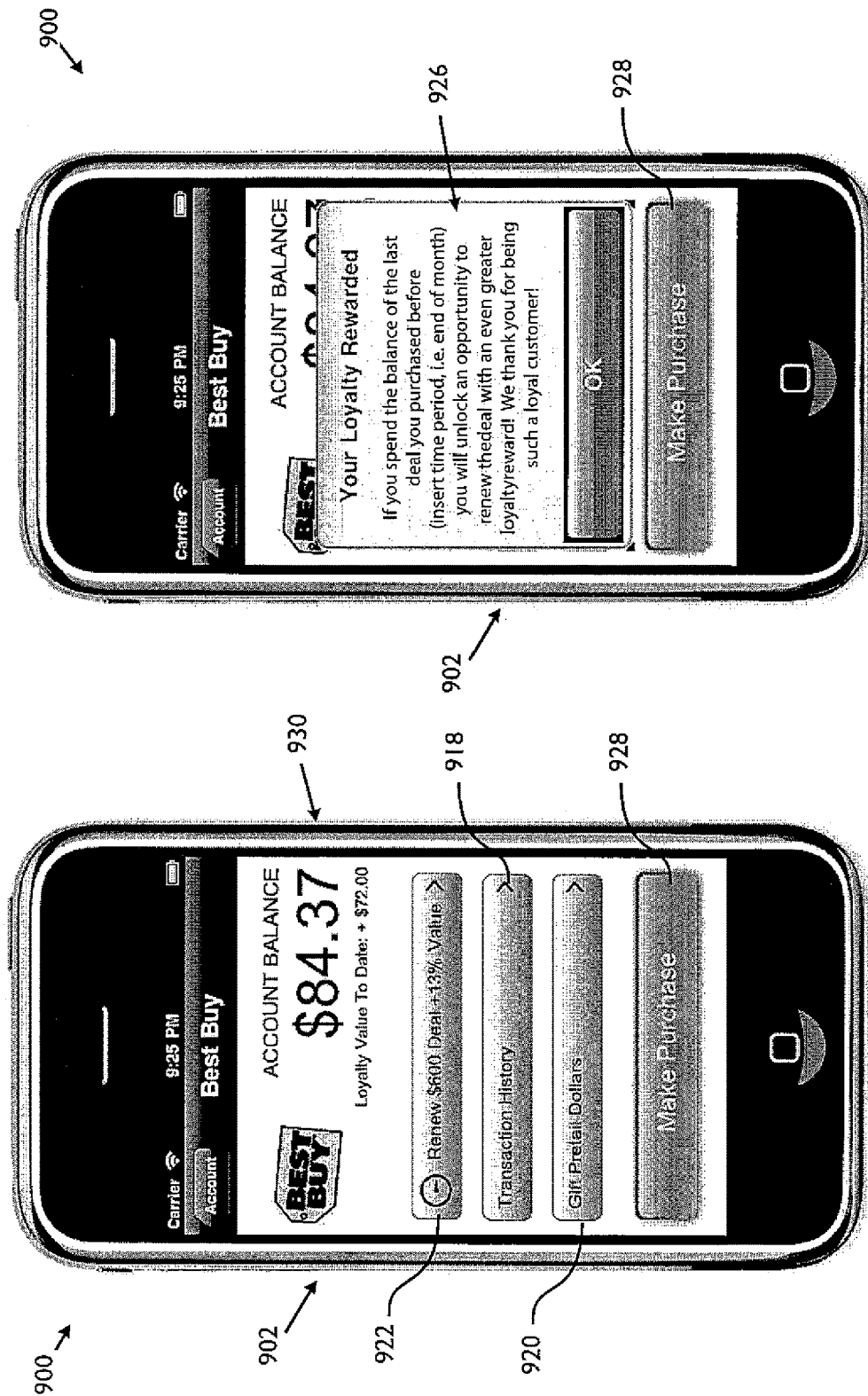

Prepaid Retail Consumer Loyalty Rewards
Value Calculation

Prepaid Consumer $ + Loyalty Reward Value = Total Consumer Value

Example:
$100 Prepaid + 12% Loyalty Reward Value = $112 Consumer Value

FIG. 13

In-Store-Allocated Loyalty Pre-Payment Loyalty Rewards Value Calculation

Consumer $ Paid at Checkout + Loyalty Reward Value = Total Consumer Value

Example:

$100 Paid at Checkout + 12% Loyalty Reward Value = $112 Consumer Value

FIG. 14

Prepaid Retail Loyalty Rewards Calculation
Weekly Purchase-type Model

Model focuses on frequent, repeat daily or weekly-type purchases to calculate loyalty reward value.

$$\text{Consumer Average Spend (Ticket)} \times [\text{Weekly Frequency}]\, 4 = \text{Consumer Monthly Purchase Value} \xrightarrow{\text{correlates}} \text{Loyalty Reward \%}$$

(Loyalty reward % may correlate with monthly purchase value, which may be set by each retailer)

$$\text{Prepaid Consumer \$} + \text{Loyalty Reward \%} = \text{TOTAL RETURNED CONSUMER VALUE}$$

FIG. 15

Prepaid Retail Loyalty Rewards Calculation
Monthly Purchase-Type Model

Prepaid Model focuses on regular, repeat monthly-type purchases to calculate loyalty reward value.

$$\text{Consumer Average Spend (Ticket)} \times \text{Monthly Frequency} = \text{Consumer Purchase Value} \xrightarrow{\text{correlates}} \text{Loyalty Reward \%}$$

(Loyalty reward % may correlate with purchase value, which may be set by each retailer)

$$\text{Prepaid Consumer \$} + \text{Loyalty Reward \%} = \text{TOTAL RETURNED CONSUMER VALUE}$$

FIG. 16

Prepaid Retail Loyalty Rewards Calculation
Yearly Purchase-Type Model

Prepaid Model focused on purchases made multiple times per year to calculate loyalty reward value.

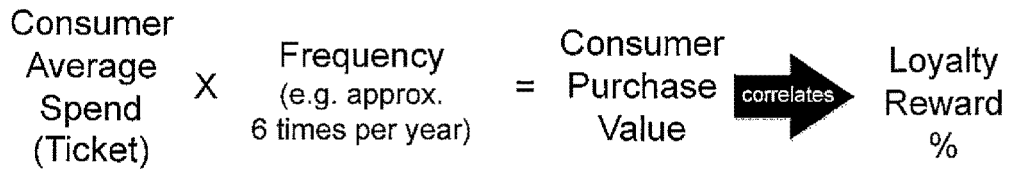

(Loyalty reward % may correlate with purchase value, which may be set by each retailer)

Prepaid Consumer $ + Loyalty Reward % = TOTAL RETURNED CONSUMER VALUE

FIG. 17

Prepaid Retail Loyalty Rewards Calculation
Time-Based Incentive Purchase -Type Model Prepaid Retail Model combined with a time-based incentive model to calculate loyalty reward value.

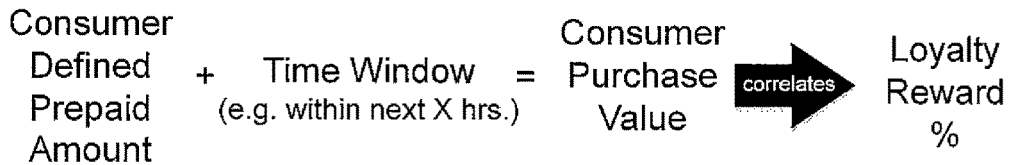

(Loyalty reward % may correlate with purchase value, which may be set by each retailer)

Prepaid Consumer $ + Loyalty Reward % = TOTAL RETURNED CONSUMER VALUE

FIG. 18

Prepaid Retail Loyalty Rewards Calculation
Commitment Based Purchase-Type Model Prepaid Model combined with a repeat allocation commitment to calculate loyalty reward value.

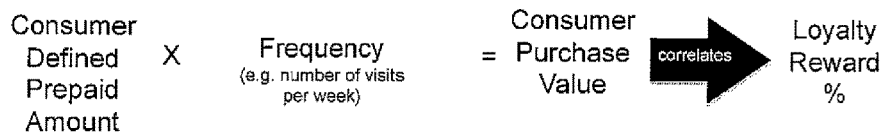

Consumer Defined Prepaid Amount × Frequency (e.g. number of visits per week) = Consumer Purchase Value → correlates → Loyalty Reward %

(Loyalty reward % correlates with purchase value, which may be set by each retailer)

Prepaid Consumer $ + Loyalty Reward % = TOTAL RETURNED CONSUMER VALUE

FIG. 19

Prepaid Retail Loyalty Rewards Calculation
Renewal of Commitment Based Purchase-Type Model Prepaid Model combined with a repeat allocation commitment to calculate loyalty reward value. Renewal of commitment has a multiplier. First deal returns X. Re-up (especially in a time window), rewards X + Y

Consumer Defined Prepaid Amount × Frequency (e.g. number of visits per week) × Duration (e.g. committed repeat allocations) = Consumer Purchase Value → correlates → Loyalty Reward %

(Loyalty reward % correlates with purchase value, which may be set by each retailer)

Prepaid Consumer $ + Loyalty Reward % = TOTAL RETURNED CONSUMER VALUE

FIG. 20

Prepaid Retail Loyalty Rewards Calculation
Renewal of Commitment Based and Influence Score
Purchase-Type Model Prepaid Retail Model combined with a repeat allocation commitment and the calculated against an influence score to calculate loyalty reward value. Renewal of commitment has a multiplier. First deal returns X. Renew (especially in a time window), rewards X + Y.

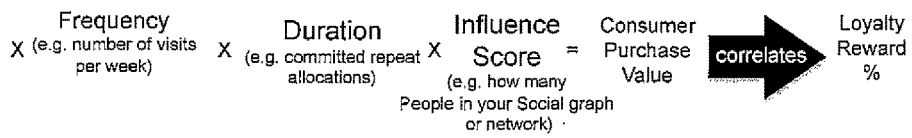

Frequency (e.g. number of visits per week) X Duration (e.g. committed repeat allocations) X Influence Score (e.g. how many People in your Social graph or network) = Consumer Purchase Value correlates Loyalty Reward %

Adding an influence score, derived from the size of a consumers social graph or network (e.g. Facebook or Twitter or other social networking type product), influences Consumer Purchase Value and the loyalty reward. Influence score of 200 friends may yield different loyalty vs. 2,000 friends.

(Loyalty reward % may correlate with purchase value, which may be set by each retailer)

Prepaid Consumer $ + Loyalty Reward % = TOTAL RETURNED CONSUMER VALUE

FIG. 21

Prepaid Retail Loyalty Rewards Calculation
Market Condition Purchase-Type Model Prepaid model combined with a market condition variable of non-peak or seasonality, such as frozen smoothies being sold in winter, to calculate loyalty reward value.

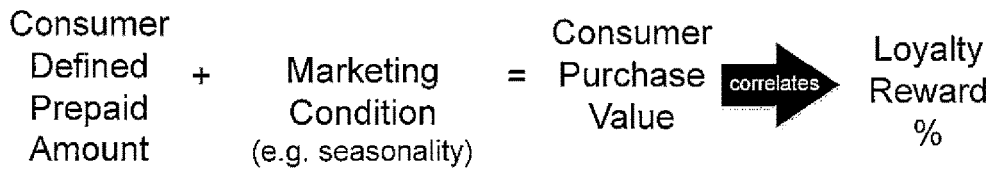

Consumer Defined Prepaid Amount + Marketing Condition (e.g. seasonality) = Consumer Purchase Value correlates Loyalty Reward %

(Loyalty reward % may correlate with purchase value, which may be set by each retailer)

Prepaid Consumer $ + Loyalty Reward % = TOTAL RETURNED CONSUMER VALUE

FIG. 22

In-Store-Allocated Loyalty Pre-Payment Purchase History-Based -Type Model

In-Store-Allocated Loyalty Pre-Payment model that calculates loyalty reward value based on a consumers purchase history.

Consumer Purchase History = Consumer Purchase Value 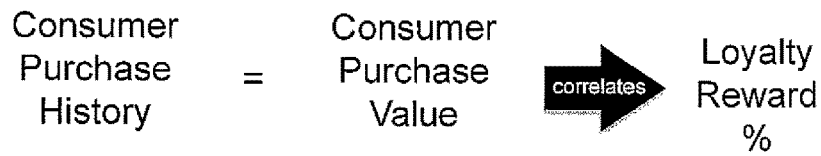 Loyalty Reward %

(Loyalty reward % may correlate with purchase value, which may be set by each retailer)

In Store Consumer Spend + Loyalty Reward % = TOTAL RETURNED CONSUMER VALUE

FIG. 23

In-Store-Allocated Loyalty Pre-Payment Purchase History & Purchase Frequency -Type Model In-store-Allocated Loyalty Pre-Payment model that uses a consumers purchase history and their frequency to calculate loyalty reward value.

Consumer Purchase History X Frequency = Consumer Purchase Value 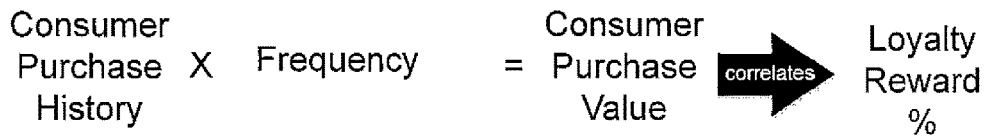 Loyalty Reward %

(Loyalty reward % may correlate with purchase value, which may be set by each retailer)

In Store Consumer Spend + Loyalty Reward % = TOTAL RETURNED CONSUMER VALUE

FIG. 24

In-Store-Allocated Loyalty Pre-Payment Time-Based Incentive Purchase-Type Model In-store-Allocated Loyalty Pre-Payment model that uses a consumers purchase history and a specific time window to calculate loyalty reward value.

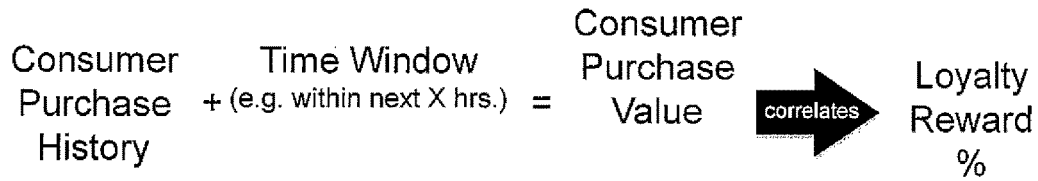

Consumer Purchase History + Time Window (e.g. within next X hrs.) = Consumer Purchase Value  correlates  Loyalty Reward %

(Loyalty reward % may correlate with purchase value, which may be set by each retailer)

In Store Consumer Spend + Loyalty Reward % = TOTAL RETURNED CONSUMER VALUE

FIG. 25

In-Store-Allocated Loyalty Pre-Payment Purchase Amount -Type Model

In-Store-Allocated Loyalty Pre-Payment model that the amount of in-store allocation to calculate loyalty reward value.

Consumer Defined Purchase Amount = Consumer Purchase Value  correlates  Loyalty Reward %

(Loyalty reward % may correlate with purchase value, which may be set by each retailer)

In Store Consumer Spend + Loyalty Reward % = TOTAL RETURNED CONSUMER VALUE

FIG. 26

In-store-Allocated Loyalty Pre-Payment Purchase Amount & Time Based Purchase-Type Model In-store-Allocated Loyalty Pre-Payment model that is calculated based on an amount a consumers states they will purchase at the retailer within a given timeframe to calculate loyalty reward value.

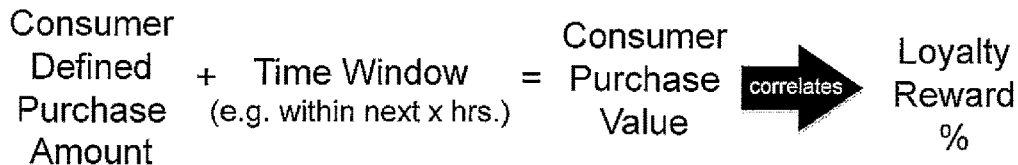

Consumer Defined Purchase Amount + Time Window (e.g. within next x hrs.) = Consumer Purchase Value  →correlates→  Loyalty Reward %

(Loyalty reward % correlates with purchase value, which may be set by each retailer)

In Store Consumer Spend + Loyalty Reward % = TOTAL RETURNED CONSUMER VALUE

FIG. 27

In-Store-Allocated Loyalty Pre-Payment Purchase Amount & Time-Based Erosion Purchase-Type Model In-Store-Allocated Loyalty Pre-Payment model where the amount a consumers states they will purchase at the retailer within a given timeframe is used to calculate the loyalty reward value.

Scenario:
An example of this could be paying in-store for restaurant X, and liking it so much I pre-pay for future visits. This offer could be time limited to renew and value erodes over time. (e.g. pre-pay within 24 hours after spend, get X % deal.) At 48 hours post-spend, offer erodes slightly X-Y to calculate loyalty reward value.

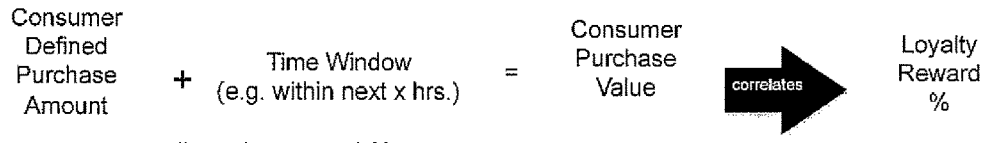

Consumer Defined Purchase Amount + Time Window (e.g. within next x hrs.) = Consumer Purchase Value  →correlates→  Loyalty Reward %

(Loyalty reward % may correlate with purchase value, which may be set by each retailer)

In-Store Consumer Spend + Loyalty Reward % = TOTAL RETURNED CONSUMER VALUE

FIG. 28

In-Store-Allocated Loyalty Pre-Payment Market Condition Purchase-Type Model

In-Store-Allocated Loyalty Pre-Payment model where the amount a consumers states they will purchase at the retailer with consideration for market condition, like seasonality, is used to calculate loyalty reward value.

Consumer Defined Purchase Amount + Marketing Condition (e.g. seasonality) = Consumer Purchase Value → *correlates* → Loyalty Reward %

(Loyalty reward % may correlate with purchase value, which may be set by each retailer)

In Store Consumer Spend + Loyalty Reward % = TOTAL RETURNED CONSUMER VALUE

FIG. 29

CREATING REVENUE SOURCES USING ALLOCATION SOURCE

CROSS-REFERENCE TO RELATED APPLICATIONS

The present patent application is a continuation-in-part patent application of U.S. patent application Ser. No. 12/564,882 titled "CREATING REVENUE SOURCES USING PAYROLL PROCESSING," filed on Sep. 22, 2009, by Michael George Lenahan et al., which claims priority to U.S. Provisional Patent Application Ser. No. 61/099,192 titled "METHODS, APPARATUSES, AND/OR SYSTEMS ASSOCIATED WITH GIFT CARD FULFILLMENT THROUGH DEDUCTIONS," filed on Sep. 22, 2008, by Michael George Lenahan et al., both of the foregoing assigned to the assignee of presently claimed subject matter and both herein incorporated by reference in their entirety.

BACKGROUND

Field

The present disclosure relates generally to electronic payment-related transactions and, more particularly, to creating new and/or reoccurring revenue sources using, in whole or in part, an allocation source.

Information

Each year brand companies invest significant marketing dollars to build brand awareness and customer loyalty. The business world recognized that the success of many retail companies revolves around repeat daily, weekly, or monthly purchases by customers that continue to seek out their favorite brands. While these customer relationships are core to their brand companies, it may be difficult to increase wallet-share of the existing customers, and to definitively forecast customers' repeat monthly spend. Typically, a wallet-share may refer to the amount of customers' total spending that brand companies are capturing in the particular categories of goods or services that they offer.

In today's competitive marketplace, simply having a strong brand or competing on price alone may be insufficient to boost long-term revenues or even prevent profit erosion. Customers expect to receive greater value for their loyalty, and to satisfy them brand companies may offer innovative experiences, customized solutions, and a convenience in a variety of situations. Today, customers are attracted to goods or services that are tailored specifically for their individual interests and spending patterns. In addition, modern-day "time famine" resulting from busy careers, family demands, and social obligations may make saving time and minimizing effort in overall shopping experience as important to customers as a good product or a low price.

To meet the demands of a progressively impatient and cost-conscious customer base, brand companies increasingly employ marketing tools, such as, for example, stored value or gift card programs, across many market segments. Gift cards may increase brand recognition by placing a particular brand and its marketing message right into a customer's wallet, for example. Besides raising awareness of brands and their product lines, a prepaid gift card may serve as an alternative payment solution for a customer or a gift recipient. In such a situation, a customer who has a branded gift card may patronize a brand company's business first and may, thus, increase its incremental sales through customer visits. In addition, the nature of a gift card makes it suitable for marketing and promotions since both the customer who purchases a gift card and the customer who receives the gift card may associate such an event with positive experiences of giving and receiving a gift in connection with a particular brand. In addition, gift card customers often tend to spend more on their favorite brands than actual denominated value stored on their gift cards.

Despite numerous benefits associated with branded gift card programs, there may be a disconnect between brand companies and their customer base. Such a disconnect, for example, may be attributed in part to the lack of unified infrastructure integrating numerous brand companies' business operations with the gift card business model. For example, customers may not be aware of specific promotional discounts that brand companies offer, may have difficulties locating a particular branded gift card, may not resort to gift cards except for top occasions, may be unwilling to spend time driving to a particular retailer to purchase a branded gift card just to save on fees, and so forth. As a result, gift cards are typically purchased on average only twice a year with a stored value of about fifty dollars per card. As such, it may be difficult for brand companies to capture larger customer wallet-share, increase repeat business, strengthen customer loyalty, and/or elevate the strength and value of their brands. Accordingly, it may be advantageous to connect brand companies with a customer base using evolving technology and processes, and adapting innovative business-building infrastructure while offering customers their favorite brands at a discount.

BRIEF DESCRIPTION OF THE DRAWINGS

Non-limiting and non-exhaustive embodiments will be described with reference to the following figures, wherein like reference numerals refer to like parts throughout the various figures unless otherwise specified.

FIGS. 9A through 9F are illustrative representations of an embodiment of an application window of a specific client device.

FIGS. 13 and 14 illustrate examples of loyalty-based reward calculations.

FIGS. 15 through 29 illustrate example loyalty rewards-based approaches.

DETAILED DESCRIPTION

Figure 1:
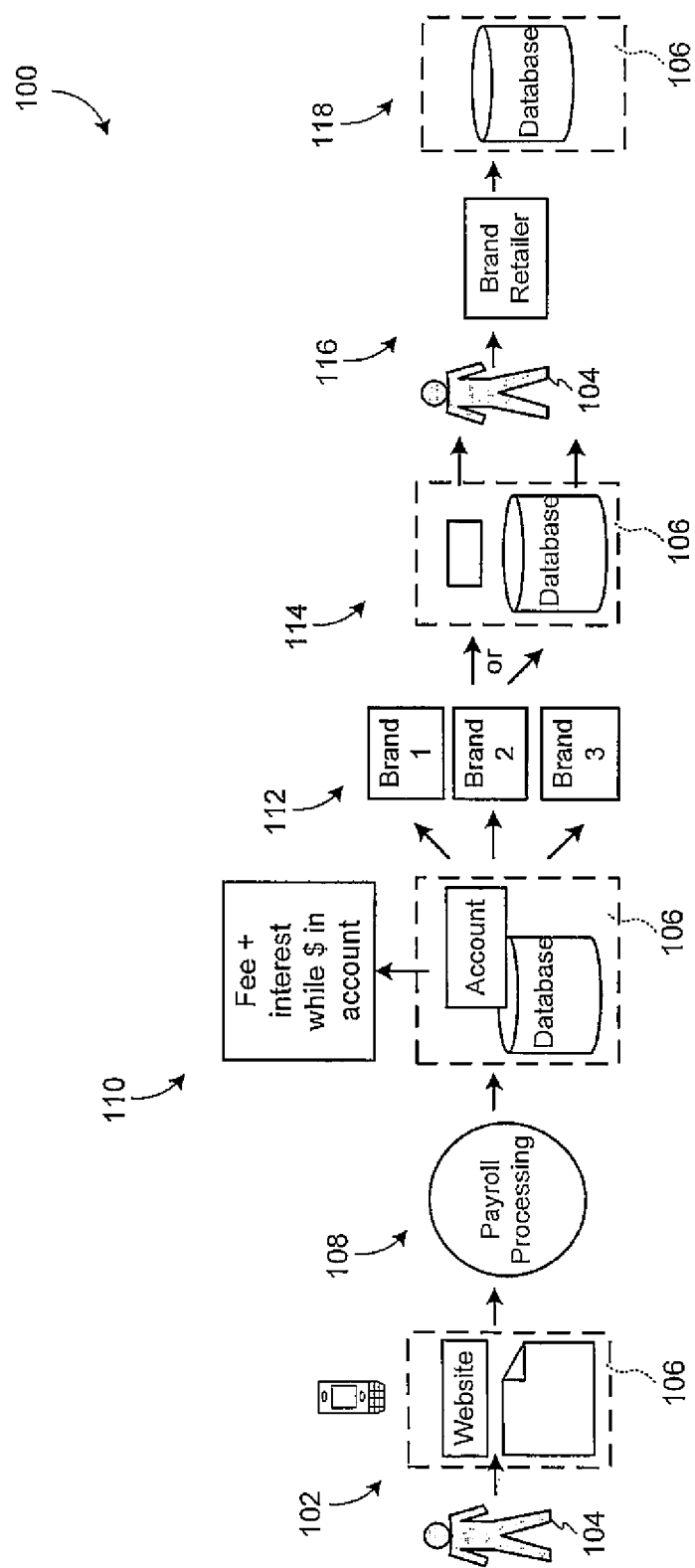
FIG. 1 is a flow diagram illustrating an implementation of a process for creating new and/or reoccurring revenue sources using payroll processing.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some examples of methods, apparatuses, and articles of manufacture are disclosed herein that may be used to create new and/or reoccurring revenue sources through one or more existing programs and/or processes, such as, for example, a branded stored value or gift card program and/or a payroll processing, so as to more definitively forecast customers' repeat spending behavior and/or capture more wallet-share than branded gift card programs alone. Before describing some examples of methods, apparatuses, and articles of manufacture in greater detail, the sections below will first introduce certain aspects of business-related programs and/or processes, which may be utilized to create new and/or reoccurring revenue sources. It should be appreciated, however, that techniques provided herein and claimed subject matter are not limited to these example implementations. For example, techniques provided herein may be adapted for use in a variety of business-building systems and/or data processing services, such as, e.g., banking and/or financial institution management, business process outsourcing, etc. In addition, any implementations or configurations described herein as "examples" are described herein for purposes of illustrations and are not to be construed as preferred or desired over other implementations or configurations.

As previously mentioned, branded gift card programs may be implemented by brand companies or other companies, for example, associated, directly or indirectly, with gift cards programs as a promotional and/or marketing tool to build the strength and value of their brands, increase customer loyalty, lower costs, and/or improve profitability, for example. Typically, although not necessarily, a customer may purchase a pre-paid card, branded or otherwise, either for personal use or as a gift for someone else (e.g., a gift card) at a specific brand company or other retailer, such as, for example, a department store or a supermarket, or a group of retailers, such as a shopping mall. As used herein, "retailer" or "brand company" may be used interchangeably and may refer to a person and/or publicly as well as non-publicly traded business entities that may provide goods and/or services on-line and/or in-store (e.g., retail store, business agency, grocery outlet, stand-alone kiosk, etc.). A gift card comprises a prepaid transaction card that may be identified by a specific number and may include a barcode or magnetic stripe on the back of the card. The amount purchased may be recorded as "stored value" or "face value" on the card and/or in the retailer's database, as will be described in greater detail below. To facilitate a purchase, the retailer may access the database, for example, by swiping the card along its magnetic stripe and may deduct the amount of the purchase from the card. After the card's stored or face value is redeemed, some retailers may allow for card reloading to periodically update it with value.

As will be described in greater detail below, in some implementations, gift card programs may be integrated with particular technology and/or processes, such as, for example, payroll processing, to create new and/or reoccurring revenue sources. In this particular context, integration may refer to communication or coordination between two or more application-specific programs and/or processes using a host application of one overall system or entity, such as, for example, a pre-spending benefit entity, as will be seen. As used herein, "payroll processing" may refer to a process or system of administration, management, and/or record-keeping of financial and other information of one or more employees relating, at least in part, to one or more employees' salaries, wages, bonuses, net pay, withholdings, and/or deductions that one or more employers may collect and use to calculate gross wages, subtract all pertinent withholdings and deductions, print checks, make direct deposits, and/or prepare all employment-related tax filings for such one or more employees. Typically, although not necessarily, withholdings and deductions may include, for example, federal, state, and/or local income taxes; Social Security and Medicare taxes; vacation and/or sick days; insurance premiums and/or retirement fund contributions, and so forth. Under some circumstances, an employer may outsource its payroll processing by engaging an outside payroll processing service or entity. in such a situation, one or more employers may communicate with such a payroll processing entity and may provide it with current payroll information, such as, for example, wages, hours, withholdings, deductions, etc., for an upcoming pay period. A payroll processing entity may charge such an employer a processing fee per pay period or on a periodic basis for payroll processing services, for example.

As will be seen, in some implementations, brand companies' commercial wallet-share may be increased through use of payroll processing implemented or otherwise supported by a pre-spending benefit entity. More specifically, as illustrated in the example implementations of the present disclosure, a pre-spending benefit entity may facilitate a transfer of funds on to a stored value or branded gift card using payroll technology and/or processes. For example, one or more employees may communicate to a pre-spending benefit entity their desire to participate in transferring a certain amount of their payroll funds (e.g., as monthly contributions) from after-tax payments (e.g., paycheck(s), direct deposit(s), etc.) to one or more brand companies in exchange for a discount. Such communications may be made via any suitable communication mechanisms, such as, for example, the public networks (e.g., the Internet, the World Wide Web, a telephone network), private networks (e.g., intranets), point-of-interaction devices (e.g., notepads, personal digital assistants, cellular phones, point-of-sale devices, in-store or stand-alone kiosks, etc.), wireless networks, local area networks (LAN), wide area networks (WAN), on-line and off-line communications, or the like.

In connection with processing the payroll, one or more employers of such one or more employees may deduct a defined amount and may transfer funds to a pre-spending benefit entity, which, in turn, may process the amount and forward the balance of funds (e.g., less processing fees, technology licensing fees, royalty fees, etc.) to one or more employee or customer-designated brand companies or retailers. Once brand companies receive such funds, the companies may instruct a pre-spending benefit entity to send one or more branded gift or stored value cards via mail and/or electronically to one or more participating employees, as will be seen. As used herein, "stored value" may refer to increased promotional retail value that may be calculated, at least in part, as the amount received by the brand companies from one or more participating employees, plus a promotional percentage brand companies may offer (e.g., a discount) that may be based, at least in part, on an amount and/or nature of an employee's contribution. Employees may subsequently redeem received branded gift cards at participating retailers (e.g., in-store and/or on-line). It should be appreciated that one or more functions and/or processes associated with a pre-spending benefit entity may be performed, partially or substantially, by one or more employers without outsourcing such functions and/or processes to a pre-spending benefit or other entity, including, for example, a payroll processing entity. In such a case, for example, one or more employers may integrate or otherwise adapt their business operations so as to realize the benefits of claimed subject matter in an embodiment or implementation that does not employ the use of a separate entity, as such. It is intended that claimed subject matter include any and all such embodiments, including those that use no separate entity, those that employ a payroll processing or other similar entity, as well as those that employ a pre-spending benefit entity.

With this in mind, attention is drawn to FIG. 1, which is a flow diagram illustrating a summary of an example process 100 for creating new and/or reoccurring revenue sources using payroll processing. At operation 102, the process may begin with a customer or employee 104 electing to enroll or otherwise participate by defining a payroll contribution in a variety of forms associated with or otherwise provided by a pre-spending benefit entity, indicated generally in dashed lines at 106. As used herein, "customer," "employee," "consumer," and/or the plural form of such terms may be used interchangeably and may refer to an individual person or persons, or entities that may be capable of participating in methods or systems disclosed in the present application, and/or may commercially benefit, directly or indirectly, from such participation. As a way of illustration, employee 104 may utilize a hard copy form or may choose to enroll on-line (e.g., using Internet-based solutions) or off-line (e.g., using intranet-based solutions), as will be seen. Initially, employee 102 may create a unique electronic employee profile via a client-server process, for example, by entering basic identifying information, such as, employee name and address, employer name and identification number, and so forth, and may be prompted for a user ID and password selection. Optionally or alternatively, an employee may choose to participate on a limited or one-time basis only (e.g., for one payroll period, one month, etc.). In such a case, employee 104 may enter basic identifying information at the time the employee elects to participate in process 100. It should be appreciated that other forms of enrollment or participation may also be utilized, such as, for example, a telephone call (e.g., via a live operator or a voice-mail), e-mail, fax, and/or the like.

Figure 2:
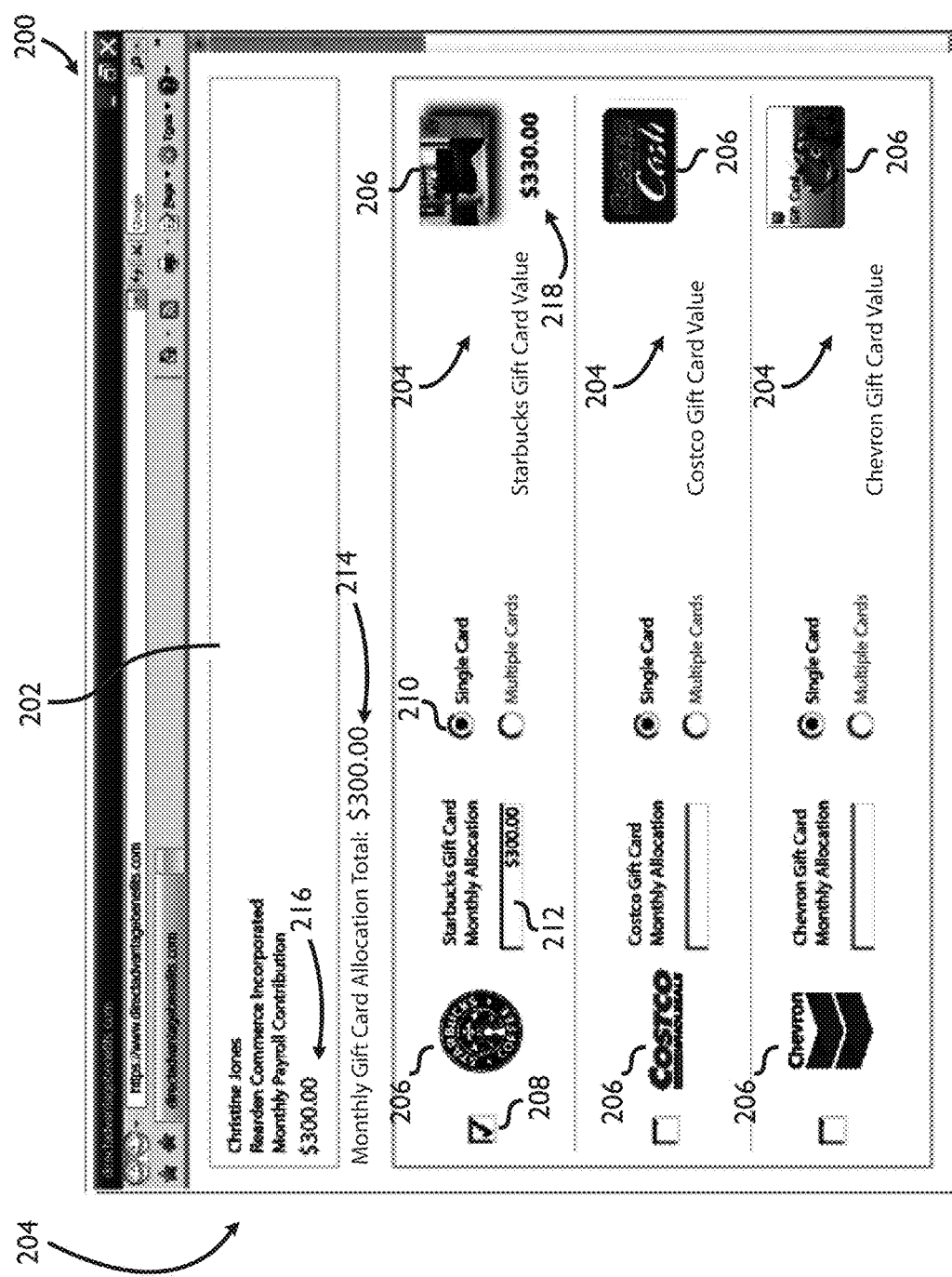
FIGS. 2 and 3 are illustrative representations of screen-shot views of implementations of an employee display.

Turning now to FIG. 2, which is a representation of an embodiment of a screenshot view of an employee display 200 that may be used to facilitate process 100. As seen, an employee may access a website associated with a pre-spending benefit entity to view participating brand companies or retailers and to define a monthly payroll contribution, for example. It should be noted that any period of payroll contribution (e.g., weekly, bi-monthly, etc.) may be used to facilitate purposes of process 100. The website may be supported by any suitable browser technology for on-line access or off-line communications of the employee with a server associated with a pre-spending benefit entity, as will be described in greater detail below. Display 200 may be operated by a special purpose computing apparatus, such as, for example, a desktop computer, a notebook, a laptop computer, or other special purpose computing device or platform that may be enabled to communicate with the server (e.g., of pre-spending benefit entity) via an electronic network, such as, for example, LAN, WAN, the Internet, etc.

As illustrated, display 200 may comprise application window 202 as a graphical user interface (GUI) for a computing application or platform to manage and/or manipulate visual or other content, such as choosing a retailer, allocating a discount, defining an amount of contribution, etc., for example. As used herein, GUI may refer to a program interface that utilizes displayed graphical information to allow an employee to control or operate a special purpose computing platform by a pointer and/or a pointing device. A pointer may refer to a cursor, arrow, or other symbol that may appear on display 200 and may be moved or controlled with a pointing device to select or populate fields or input commands via a GUI of a special purpose computing platform. A pointing device may refer to any device used to control a cursor or arrow, to select objects, to populate fields, or to input information. Such pointing devices may include, for example, a mouse, a trackball, a track pad, a track stick, a keyboard, a stylus, a digitizing tablet, or similar types of devices. A cursor may refer to a symbol or a pointer where an input selection or actuation may be made with respect to a region in a GUI. Herein, terms such a "click" or "clicking" may refer to a selection process made by any pointing device, such as a mouse, for example, but use of such terms is not intended to be so limited. For example, a selection process may be made via a touch screen. In such a case, "clicking" may be replaced by "touching." However, these are merely examples of methods of selecting objects or inputting information and claimed subject matter is not limited in scope in these respects.

Window 202 may include information fields, such as, for example, dynamic fields, indicated generally at 204 and user-selectable fields 208, 210, and 212 for facilitating one or more processes, as described in more detail previously. In some implementations, window 202 may be generated, at least in part, by a GUI and a special purpose computing platform associated with the employee, also referred to as "client," as mentioned above. Such special purpose computing platform may transmit instructions or otherwise communicate with a pre-spending benefit entity server on a network, for example, to download payroll contribution information that may be stored with reference to a user ID or a unique profile associated with a particular employee or client. Subsequently, a special purpose network server (e.g., pre-spending benefit entity) may transmit information to a special purpose client computing platform (e.g., employee) to populate information fields 204 during log-in or a payroll allocation process. Such information may include employee name and address, employer name and ID number, participating brand companies or retailers and offered discounts, just to name a few examples. In this fashion, dynamic information fields may be populated as a result of access, for example. As seen, window 202 may also include dynamically populated branding fields 206, which may comprise one or more Joint Photographic Experts Group (JPEG) or other type of formatted files representing a logo, icon, branded gift card, or any combination thereof, with respect to participating retailers, such as, Starbucks, Costco, Chevron, etc., in the present example.

Continuing with FIG. 2, window 202 may include information fields 208, 210, and 212 that may be user-selectable to provide a variety of payroll contribution information or instructions, as mentioned above. For example, an employee may select a particular retailer by clicking on field 208 and checking a corresponding box using a mouse, or other pointing or selecting device. Similarly, an employee may choose a number of gift cards to be received from selected retailers by clicking on corresponding fields, such as, for example, field 210 for a single gift card. In addition, in field 212, an employee may define amount of funds to be deducted from after-tax payments (e.g., from paycheck, direct deposit, etc.) with respect to a selected retailer.

As seen, window 202 may also include a total amount of monthly gift card allocation, displayed in field 214, that may be auto-populated based, at least in part, on information previously entered by an employee in user-selectable fields. Similarly, a total of a monthly payroll contribution and a retailer's promotional gift card value may also be auto-populated and displayed in respective fields 216 and 218, as illustrated. Additional new retailers, amounts of payroll contribution, etc., may be designated by process repetition.

Figure 3:
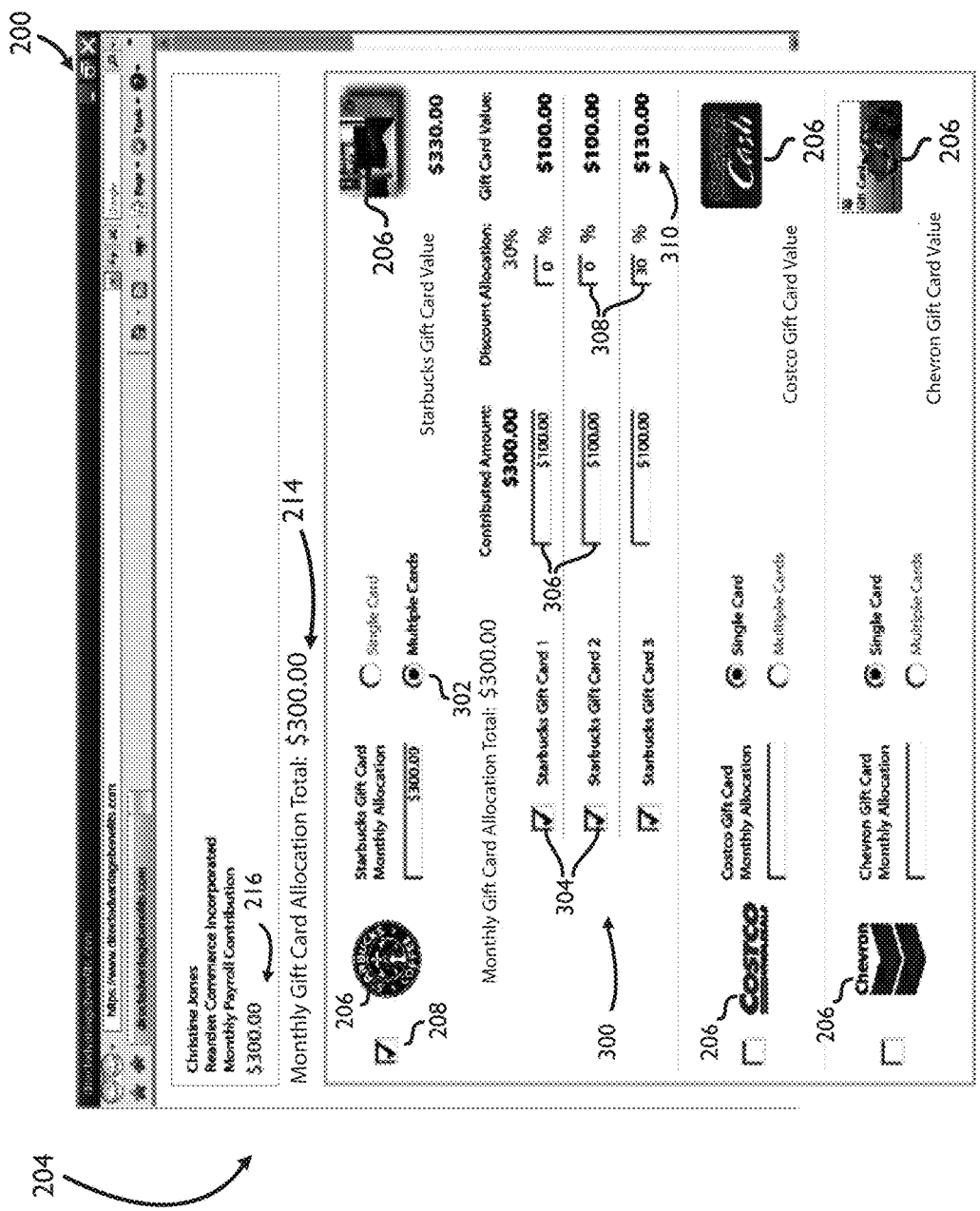

As seen in FIG. 3, application window 202 may comprise drop-down information sub-fields 300 resulting from a selection of a multiple gift cards option 302, for example. Accordingly, sub-fields 300 may prompt an employee to select a desired number of gift cards per a particular retailer (e.g., by checking boxes 304), and to define a contributed amount and a discount allocation for selected gift cards in fields 306 and 308, respectively. An employee may choose to distribute a discount equally between multiple gifts or, as illustrated, may choose to allocate such a discount towards one card. For example, an employee may choose cards 1 and 2 as gifts for someone else and may keep card 3, with added promotional retail value, shown at field 310, for personal use. Of course, such details of the display are merely examples and claimed subject matter is not so limited.

As was indicated, in some implementations, client or employee 104 may elect to participate in process 100 using a variety of specific client devices, such as, for example, mobile phones, personal digital assistants, notepads, and the like, that may be enabled to communicate with a special purpose server computing platform associated with a pre-spending benefit entity. Such specific client devices may comprise one or more Central Processing Units, a memory, an input/output device (e.g., keypad, touch screen, etc.), a display, and an associated GUI to display visual content for review and input of information, as previously described with reference to FIGS. 2-3. It should be appreciated that such specific client devices may have a variety of different resident platforms and/or applications. In some implementations, such visual content may be rendered by an application, such as an information entry and processing application, which may reside on a specific device of a client or employee. Optionally or alternatively, such visual content may be rendered by a network browser residing on a specific client device that may receive information from a network server associated with a pre-spending benefit entity, for example. It should be noted that such visual content may or may not be encrypted.

In addition, a GUI may be enabled so as to allow an employee to participate in process 100 in response to an application that may reside on a specific client device and may or may not be associated with a pre-spending benefit entity. For example, as an employee makes purchases from various retailers, transactions may be stored in memory of a device (e.g., via scan-based and/or RFID-based solutions). Upon activation of an application by an employee, such information may be displayed in the form of an itemized purchase history, for example, and may include purchase dates, retailers, purchase amounts and types (in-store, on-line, etc.), just to name a few examples. Based, at least in part, on such history, an employee may be able to evaluate his or her purchasing patterns with respect to purchasing inventory and/or particular retailers. The employee, then, may be offered to participate in the payroll contribution process, for example, by touching or otherwise selecting a command to do so (e.g., via a key, button, icon, logo, tile, etc.), and may be subsequently prompted to enter payroll contribution instructions, as discussed above. Accordingly, such an application may facilitate convenient collaboration among consumers and providers of goods or services by keeping consumers apprised of promotional and other marketing opportunities available in the marketplace.

It should be appreciated that employee 104 may elect to participate in process 100 via a stand-alone computing platform, such as, for example, a point-of-sale terminal or an outside kiosk, that may or may not be associated with a pre-spending benefit entity. Such kiosk may include a network browser or a similar application that may enable the kiosk to interact with a server (e.g., pre-spending benefit entity), located on a network, such as the Internet, intranets, and/or the like, as also described with reference to FIGS. 2-3. Of course, various embodiments of specific client devices and associated GUIs are possible, and the above examples are not intended to limit claimed subject matter to a particular embodiment.

After completion, employee instructions may be communicated to a pre-spending benefit entity server on a network, which may transmit instructions to one or more employers and/or entities administering or otherwise managing payroll processing for such an employee. It should be noted that such electronic content may be encrypted for security reasons. Such encryption may be applied to all or part of any electronic content and may include, for example, user ID and permission information (e.g., access passwords, etc.) and/or the like. Optionally or alternatively, such electronic content may be stored on a server associated with a pre-spending benefit entity on a network, which may be accessible via LAN, WAN, or the Internet to one or more employees. Of course, such details of process 100 are merely examples, and claimed subject matter is not so limited.

In some implementations, brand retailers may offer various discounts based, at least in part, on an amount of total payroll contribution, duration of employee's participation (e.g., single versus multi-month agreement), whether the contribution is allocated or unallocated, or any combination thereof. For example, after election to participate in a payroll contribution process, an employee may define a specific amount of contributions with or without allocation of funds with respect to particular retailers. If no allocation is made, unallocated funds may be transferred into an employee's account (e.g., hosted by a pre-spending benefit entity), upon which an employee may view and allocate funds at anytime by accessing a website, as illustrated in FIGS. 2-3. Without allocation of funds after enrollment (e.g., commitment from the employee), brand companies may be able to offer modest discounts to such an employee. The employee may also choose, after enrollment, to specifically allocate funds to a particular brand company in monthly or multi-monthly contributions, for example. In such a case, after funds have been transferred into an employee's account, such funds may be displayed on the website as a balance with a selected brand company along with a discount offered, as particularly seen in FIGS. 2-3. An employee's commitment to a particular brand company may result in greater retailer discounts than previously mentioned modest discounts. It should be noted that an employee may allocate funds to more than one retailer and/or may allocate a portion of contributed funds while leaving the remaining funds unallocated. It should be also appreciated that allocated funds may not be re-allocated or otherwise modified by an employee after instructions are entered or otherwise communicated to a pre-spending benefit entity, as will be described in greater detail below.

Referring back to FIG. 1, at operation 108 one or more employers may receive instructions with an employee's defined payroll contributions. As previously mentioned, such instructions may be communicated over a network from a special purpose server or computing platform maintained by or associated with a pre-spending benefit entity. During payroll processing, defined contributions may be deducted and deposited into an employee's account created by and/or associated with pre-spending benefit entity 106. With regard to operation 110, pre-spending benefit entity 106 may generate return on interest from deposited funds, for example, by transferring all or a portion of such funds to one or more banking and/or financial institutions for a holding period (e.g., one week), if implemented. A pre-spending benefit entity may also collect appropriate fees, such as, for example, a processing fee, a technology licensing fee, a royalty fee, and/or the like, and may subsequently transfer any balance of the allocated funds to designated brand companies. It should be appreciated that an outside payroll processing entity may be engaged to process payroll. In such a case, a pre-spending benefit entity may also collect a percentage of the payroll allocation fee that may be delivered by such payroll processing entity.

Further, at operation 112, one or more brand companies may receive transferred funds and may add a promotional percentage that they currently offer, thus, yielding increased promotional retail value for branded gift cards, as previously mentioned. As used herein, terms "card," "pre-paid card," "branded gift card," "stored value card," "omni-stored value card" are to be interpreted broadly and may refer to one or more transaction instruments in any stored value format (e.g., plastic card and/or coupon, electronic card and/or coupon, paper card, coupon, and/or certificate, etc.), that may be associated with corresponding transaction accounts of respective one or more employees and may have a cash equivalent value redeemable within a transaction infrastructure. It should be appreciated that such cards may or may not be reloadable with value. It should also be noted that such cards may include one or more types of electronic or electrical functionality (e.g., smart chip, digital paper, radio-frequency enabled, displayable barcode or number code, etc.), such as may be supported by one or more networks to further implement particular functions of these cards. In addition, transaction accounts may be implemented in physical embodiments (e.g., financial instruments, etc.) and/or non-physical embodiments (e.g., frequent flier miles account, cash back account, calling card account, etc.).

In an implementation, upon receipt of funds, one or more brand companies may instruct a pre-spending benefit entity to send one or more gift cards via mail and/or electronically to one or more employees or designated gift recipients, as indicated at operation 114. It should be appreciated that brand companies may send one or more gift cards to one or more employees or gift recipients directly in any suitable stored value format. As a way of illustration, brand companies and/or a pre-spending benefit entity may physically mail to such one or more employees or gift recipients one or more branded gift cards and/or coupons, redeemable in-store and/or on-line. In addition, so-called omni-stored value or gift cards may be designated and/or used by one or more employees or gift recipients. Omni-stored value cards may be issued by or otherwise directly associated with a pre-spending benefit entity and may represent a one-card proxy for multiple branded stored value or gift cards. For example, an omni-stored value card may consolidate multiple gift cards onto a single card that may be freely used at different participating retailers (e.g., on-line and/or in-store). It should be noted that an omni-stored value card may have an additional specified discount (e.g., a membership discount). Further, omni-stored value cards may pool and store different values reflective of multiple balances with multiple retailers within a card's general pool of stored face value. For example, an omni-stored value card may store $100 allocated to Starbucks, $50 to Costco, $50 to Chevron and, thus, may have a total stored face value of $200. It should be appreciated that retailers' stored values and/or balances may or may not be transferrable from one retailer to another within such omni-stored value card.

It should also be noted that, in some implementations, omni-stored value cards may pool and store a general unallocated value or balance that may be linked to an employee's or customer's pre-spend account associated with a pre-spending benefit or other entity (e.g., payroll processing entity, employer, etc.). In such a case, general pool of funds may represent stored or face value of such omni-stored value card that may be used, partially or substantially, at any participating retailer for a modest discount since no specific "pre-spend" allocation took place, as previously discussed (e.g., unallocated funds). For example, one or more employees and/or gift recipients may redeem such omni-stored value card at a participating retailer and funds may be debited to a pre-spend account of such one or more employees at time of purchase. In addition, a particular promotional discount may also be applied by a retailer at time of purchase.

In some implementations, one or more brand companies and/or a pre-spending benefit entity may send one or more branded gift cards or their stored value equivalents electronically to one or more employees and/or designated gift recipients. To illustrate, such equivalents may be in the form of an electronic coupon to be displayed on and read directly off the screen or display of a specific employee device (e.g., mobile phone, PDA, notebook, etc.), for example, via scan-based or RFID-based solutions; a printable electronic gift card or coupon redeemable on-line or in-store; and/or the like. Optionally or alternatively, the above gift cards or their stored value equivalents may be taken into a retail store to be scanned and exchanged for a physical branded gift card and/or omni-stored value card.

As mentioned above, as brand companies and/or a pre-spending benefit entity send gift cards to designated employee(s) and/or gift recipient(s), such information may be communicated, continually or from time to time, to a host server computer or computing platform associated with a pre-spending benefit entity, where such information may be maintained and may be accessible to one or more employees upon log-in (e.g., as an employee account information).

At operation 116, one or more employees and/or designated gift recipients may redeem received one or more branded gift cards and/or their stored value equivalents at participating retailers in a variety of forms, as mentioned above.

At operation 118, as one or more employees make their respective purchases at one or more participating retailers, information representative of such purchases may be communicated in real time or substantially concurrently to a server computer or computing platform associated with a pre-spending benefit entity, a payroll processing entity or other entity, including, for example, an employer in some embodiments, where respective employees' accounts may be updated with such information. After receipt of such information, a server may be enabled to communicate and/or download updated information onto a specific employee device for real-time display of respective updates that may reflect one or more employees' payroll contribution account(s). As used herein, "real time" may refer to amount of timeliness of data or information which has been delayed by an amount of time attributable to electronic communication and automatic data processing.

To reduce cards' value "breakage", for example, the pre-spending benefit entity may facilitate a creation of tradable discounts (e.g., a secondary marketplace) that may or may not be hosted on an entity's server. In the context of the present disclosure, "breakage" may refer to branded gift cards or their stored value equivalents that are purchased or otherwise paid-for but are expired or never used. Accordingly, a secondary marketplace may represent a virtual or physical trading place where tradable discounts may be sold or otherwise traded at additional substantial discounts. As used herein, "tradable discounts" may generally refer to one of more branded gift cards and/or their stored value equivalents that are unwanted and/or partially or substantially unredeemed. Optionally or alternatively, brand companies may retain all or part of any residual values that may be left on cards, for example, as an incentive to participate in process 100.

Figure 4:
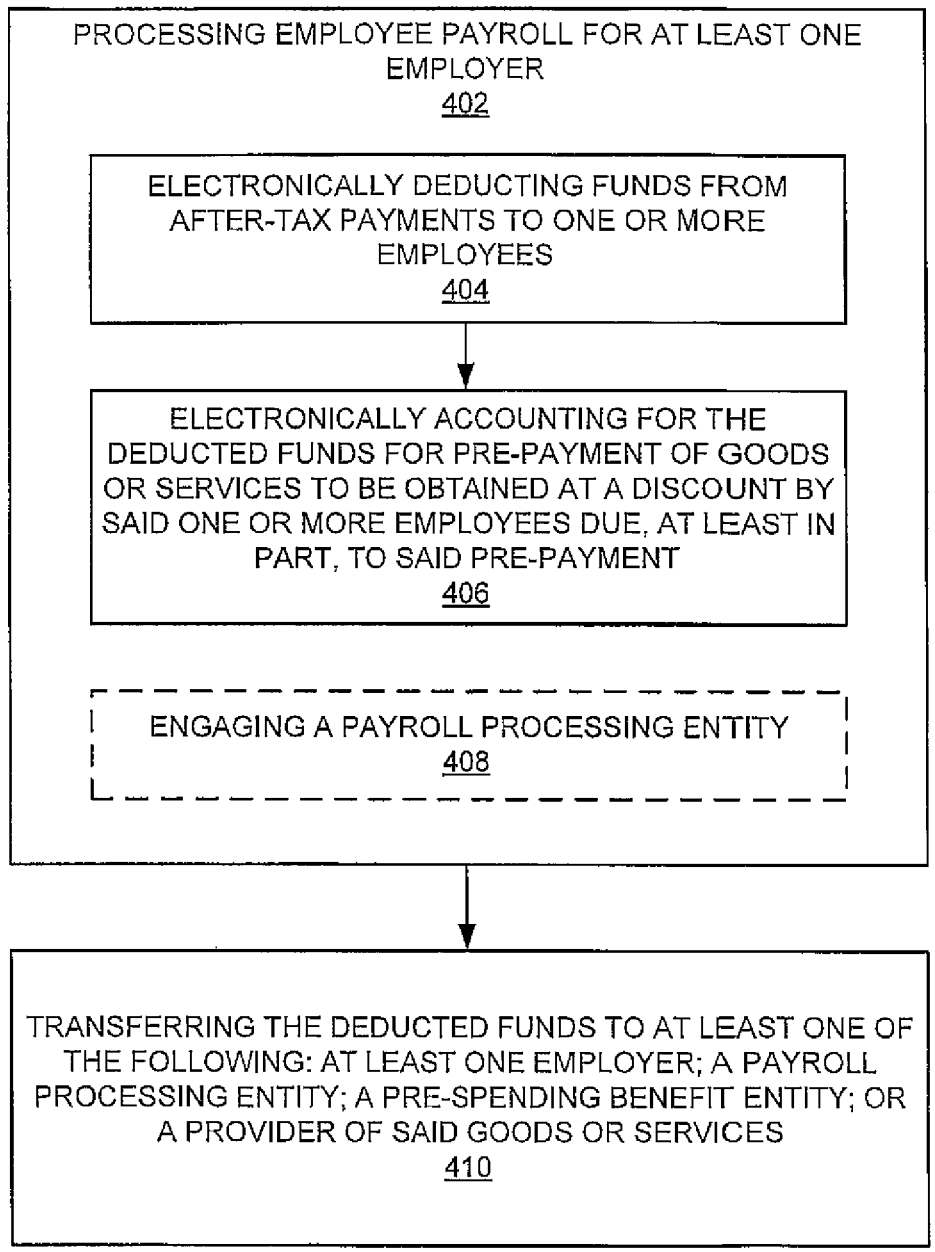
FIG. 4 is a flow diagram illustrating an implementation of a process for creating revenue sources.

FIG. 4 is a flow diagram illustrating particular features 400 that may be present in an example process of creating new and/or reoccurring revenue sources using employee payroll. One or more employees with access to the Internet, for example, may elect to participate in a payroll contribution process. As such, one or more employees may provide to a pre-spending benefit entity personal information (e.g., for a unique employee profile) and instructions defining payroll contributions in the form of deductions, for example. An example process may proceed at operation 402 where processing employee payroll for at least one employer may be initiated. For example, such processing may comprise electronically deducting funds from after-tax payments (e.g., from paychecks, direct deposits, etc.) based, at least in part, on an employee's instructions, as indicated at operation 404. Next, at operation 406, payroll processing may further account for deducted funds that may be prepaid in exchange for a discount from participating providers of goods or services (e.g., brand companies, retailers, etc.) due to such prepayment. For example, such funds may include a specific amount to be allocated, an amount of such allocation, a discount distribution for selected retailers, just to name a few examples. Any balance of payroll funds may subsequently be forwarded to an employee as earnings for a particular pay period. At operation 408, an employer may engage or otherwise outsource payroll processing to an outside payroll processing service or entity. It should be noted that operation 408 may be optional in certain implementations. Finally, after completion of payroll processing, at operation 410, deducted funds may be transferred to an employee's account that may be created by or otherwise associated with a pre-spending benefit entity. Employees may view, for example, allocated funds and may allocate or manage unallocated funds within their respective accounts by logging-in onto a pre-spending benefit entity's website. Optionally or alternatively, deducted funds may be transferred directly to one or more participating providers of goods or services.

Figure 5:
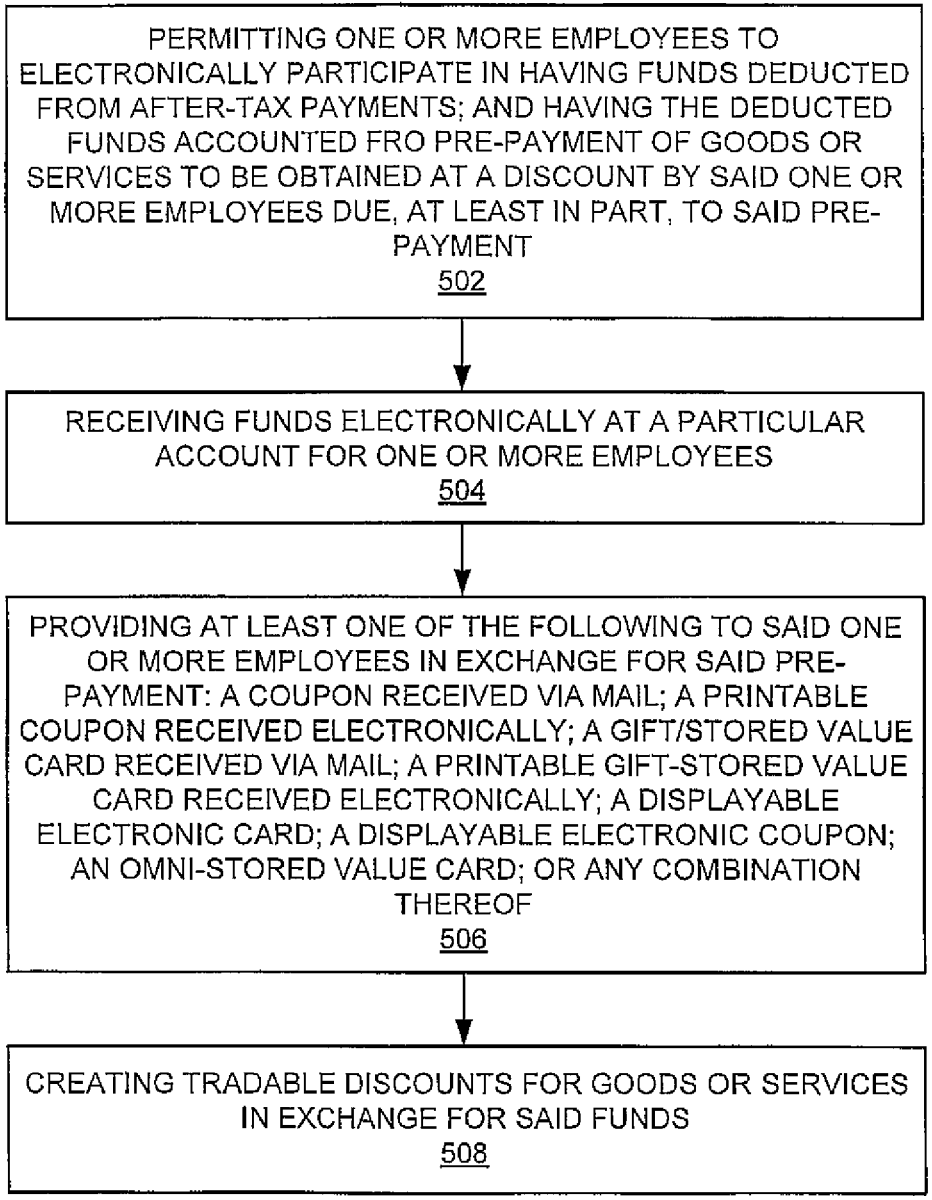
FIG. 5 is a flow diagram illustrating particular features of the implementation of the process of FIG. 1.

FIG. 5 is a flow diagram further illustrating particular features that may be present in the example process of FIG. 1. At operation 502, as previously described, based, at least in part, on communications received from one or more employees, a pre-spending benefit entity may allow such one or more employees to participate in process 100. For example, such participation may be rendered by an application, which may reside on an employee's specific device or by a network browser residing on an employee's special purpose computing platform that may receive enrollment-related information from a network server associated with a pre-spending benefit entity, for example. Next, at operation 504, a pre-spending benefit entity or a provider of goods or services, such as, for example, one or more brand companies, may receive funds defining payroll contributions for a participating employee. After funds have been received, at operation 506, a pre-spending benefit entity and/or brand companies may send to a designated employees and/or gift recipients one or more branded gift cards and/or their stored value equivalents where a specific discount has been applied to create a new promotional retail value (e.g., a printable coupon, a physical gift card, a displayable electronic card, etc.) via mail and/or electronically. Cards and/or their equivalents may be redeemed at participating retailers (e.g., in-store and/or on-line). At operation 508, a pre-spending benefit entity may create tradable discounts, such as, for example, a secondary marketplace of unwanted or unredeemed branded gift cards and/or their stored value equivalents, which may be sold or otherwise traded at additional substantial discounts to reduce "breakage," as previously mentioned.

Figure 6:
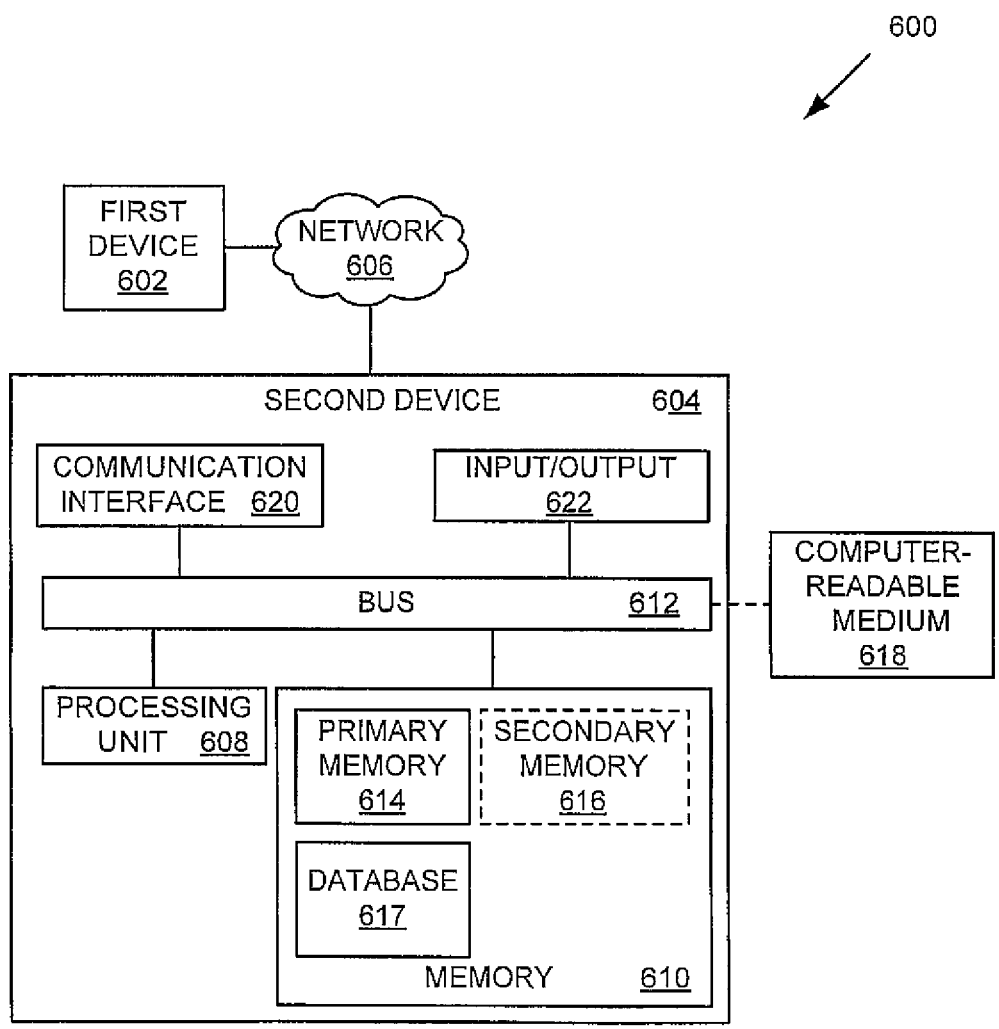
FIG. 6 is a schematic diagram illustrating an implementation of a computing environment associated with one or more special purpose computing apparatuses supportive of the process of FIG. 1.

FIG. 6 is a schematic diagram illustrating an example computing environment 600 that may include one or more devices that may be configurable to partially or substantially implement a process for creating new and/or reoccurring revenue sources using one or more techniques described herein, such as, for example, payroll processing.

Computing environment system 600 may include, for example, a first device 602 and a second device 604, which may be operatively coupled together via a network 606. Although not shown, optionally or alternatively, there may be additional like devices operatively coupled to network 606

In an embodiment, first device 602 and second device 604 may be representative of any electronic device, appliance, or machine that may be configurable to exchange data over network 606. For example, first device 602 and second device 604 may include: one or more computing devices or platforms, such as, e.g., a desktop computer, a laptop computer, a workstation, a server device, data storage units, or the like.

Network 606 may represent one or more communication links, processes, and/or resources configurable to support exchange of data between first device 602 and second device 604. By way of example but not limitation, network 606 may include wireless and/or wired communication links, telephone or telecommunications systems, data buses or channels, optical fibers, terrestrial or satellite resources, local area networks, wide area networks, intranets, the Internet, routers or switches, and/or the like.

It should be appreciated that all or part of various devices and/or networks shown in computing environment system 600, and processes and/or methods as described herein, may be implemented using or otherwise include hardware, firmware, or any combination thereof along with software.

Thus, by way of example but not limitation, second device 604 may include at least one processing unit 608 that may be operatively coupled to a memory 610 through a bus 612. Processing unit 608 may represent one or more circuits to perform at least a portion of a data computing procedure or process. As a way of illustration, processing unit 608 may include one or more processors, controllers, microprocessors, microcontrollers, application specific integrated circuits, digital signal processors, programmable logic devices, field programmable gate arrays, and/or the like.

Memory 610 may represent any data storage mechanism. For example, memory 610 may include a primary memory 614, a secondary memory 616, and/or a database 617. Primary memory 614 may include, for example, a random access memory, read only memory, etc. While illustrated in this example as being separate from processing unit 608, it should be appreciated that all or part of primary memory 614 may be provided within or otherwise co-located/coupled with processing unit 608.

Secondary memory 616 may include, for example, the same or similar type of memory as primary memory and/or one or more data storage devices or systems, such as, for example, a disk drive, an optical disc drive, a tape drive, a solid state memory drive, etc. In certain implementations, secondary memory 616 may be operatively receptive of, or otherwise enabled to be coupled to, a computer-readable medium 618. Computer-readable medium 618 may include, for example, any medium that can store and/or provide access to data, code and/or instructions for one or more devices in system 600.

Database 617 may comprise any data storage mechanism and may be enabled to store or otherwise provide access to information in a variety of information processing environments partially or substantially associated with process 100 (e.g., employees account information, purchase history information, etc). While illustrated in this example as being separate from primary memory 614 and secondary memory 616, it should be appreciated that all or part of database 617 may be provided within or otherwise co-located/coupled with respective memories 614 and 616, or stored elsewhere in a memory in other embodiments.

Second device 604 may include, for example, a communication interface 620 that may provide for or otherwise support operative coupling of second device 604 to at least network 606. By way of example but not limitation, communication interface 620 may include a network interface device or card, a modem, a router, a switch, a transceiver, and/or the like.

Second device 604 may include, for example, an input/output device 622. Input/output device 622 may represent one or more devices or features that may be able to accept or otherwise input human and/or machine instructions, and/or one or more devices or features that may be able to deliver or otherwise output human and/or machine instructions. By way of example but not limitation, input/output device 622 may include a display, speaker, keyboard, mouse, trackball, touch screen, data port, and/or the like.

Figure 7:
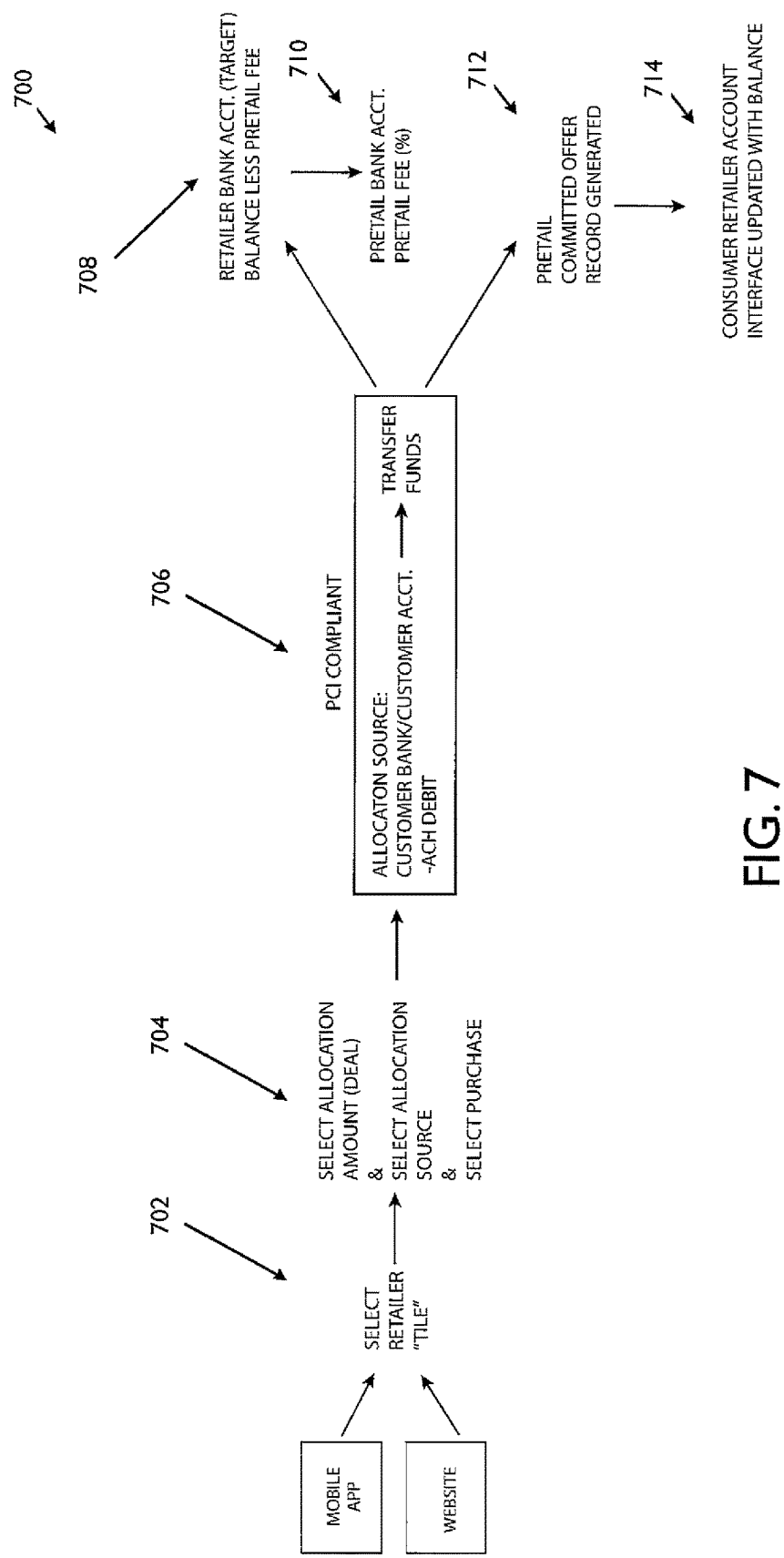
FIG. 7 is a flow diagram further illustrating particular features of an example process for creating new and/or reoccurring revenue sources.

FIG. 7 is a flow diagram further illustrating particular features 700 that may be present in an example process for creating new and/or reoccurring revenue sources, such as process 100 of FIG. 1, for example, if a pre-spending benefit entity associates or engages, in whole or in part, an allocation source. It should be noted that information acquired or produced, such as, for example, input signals, applications, output signals, operations, results, etc. associated with example process 700 may be represented by one or more digital signals. It should also be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

As used herein, "allocation source" is to be interpreted broadly and may refer to one or more persons or entities capable of providing financial or like services to one or more customers or employees to further one or more purposes for creating new and/or reoccurring revenue sources. For example, an allocation source may comprise a bank, trust company, insurance company, payroll processing entity, pension fund, stock broker, risk underwriter, loan company, investment house, venture capital firm, or other suitable financial or like institution of interest, or any combination thereof. In some instances, financial or like services may include, for example, banking, accounting, payroll, trade or commerce, currency exchange, asset or hedge management, venture capital or investment, debt resolution, micro-financing, funds intermediation or advisory, etc. related services, or any combination thereof. It should be appreciated that one or more functions and/or operations performed by or in connection with an allocation source may be performed, in whole or in part, by a pre-spending benefit entity without engaging or associating an allocation source. For example, a pre-spending benefit entity may comprise an allocation source. It should also be noted that an allocation source may or may not be associated with a customer or employee.

At operation 702, a suitable customer, such as a customer enrolled or registered with a pre-spending benefit entity, for example, and having access to the Internet may select a suitable participating retailer in connection with one or more processes associated with creating new and/or reoccurring revenue sources, such as, for example, in connection with a process of allocating funds. As previously mentioned, a customer may select a retailer by accessing a suitable website, such as a website associated with a pre-spending benefit entity, for example, using one or more techniques, such as techniques discussed above in connection with FIGS. 2-3, just to illustrate one possible implementation. Optionally or alternatively, a customer may select a retailer via a GUI associated with any suitable mobile communication device, for example, utilizing one or more special purpose resident or host applications. A resident or host application may be supported by any suitable mobile browser technology that may facilitate a customer's access to or communications with any suitable server, such as a server associated with a pre-spending benefit entity, for example, to further implementation of process 700. At operation 702, a customer may select a retailer by clicking on or touching (e.g., on a touch screen, etc.) a corresponding branded logo, icon, or so-called "tile" representative of a participating retailer, such as, Starbucks, Costco, Chevron, Best Buy, Target, just to name a few examples. Certain functional features of a mobile device comprising a host application that may be utilized, at least in part, in connection with one or more operations for creating new and/or reoccurring revenue sources will be described in greater detail below with reference to FIGS. 9A-9F.

As used herein, "mobile communication device," "mobile device," "wireless device," "hand-held device," or the plural form of such terms may be used interchangeably and may refer to any kind of special purpose computing platform or device that may be capable of communicating through wireless transmission or receipt of state or signal information over suitable communications networks according to one or more communication protocols and that may from time to time have a position or location that changes. As a way of illustration, special purpose mobile communication devices, which may herein be called simply mobile devices, may include, for example, cellular telephones, satellite telephones, smart telephones, personal digital assistants (PDAs), laptop computers, personal entertainment systems, e-book readers, tablet personal computers (PC), personal audio or video devices, personal navigation devices, or the like. It should be appreciated, however, that these are merely illustrative examples of mobile devices that may be utilized, in whole or in part, in connection with creating new and/or reoccurring revenue sources, and that claimed subject matter is not limited in this regard. It should also be noted that, in some instances, a mobile device may comprise, for example, a specific client device having one or more levels of security, which may depend, at least in part, on a particular application, as will also be seen.

At operation 704, a customer may utilize a suitable application window, such as a window comprising a GUI associated with a mobile device, for example, so as to specify or input one or more parameters of interest that may be pertinent to the customer in connection with a process of allocating funds towards a designated or selected retailer. As described below, in some instances, parameters of interest may be specified via one or more selectable information fields, such as one or more tabs, toolbars, scroll bars, hyperlinks, images, icons, menus, and/or other selectable content. On-screen content, selectable or otherwise, may be displayed on an application window associated with a mobile device so as to provide an ergonomic, effective, and/or interactive user environment, as previously mentioned. Accordingly, a customer may, for example, specify or input one or more parameters of interest by clicking, touching, or otherwise selecting a corresponding tab or bar on a screen or display of a mobile device. For example, a customer may select an allocation amount corresponding to a particular or offered deal, monetary or otherwise, a suitable allocation source, such as a particular bank or transaction account, and may confirm the deal or purchase by clicking on a corresponding on-screen bar or button, just to illustrate one possible implementation. In some instances, parameters of interest may also comprise a customer's monthly commitment with respect to allocating funds or monthly spend, purchasing intent, or the like, if applicable, as another possible example. As will also be seen, an allocation amount may reflect or be representative of a discount that a retailer may be willing to offer to reward a customer based, at least in part, on a level of customer loyalty. By way of example but not limitation, a level of customer loyalty may be determined based, at least in part, on an incentive-based marketing tool, such as a loyalty calculator, for example, tracking a customer's spending behavior, incentives, etc. with respect to a particular retailer. For example, a loyalty calculator may consider or account for an amount of allocated funds, purchase history, purchase frequency, or the like, or any combination thereof. A particular example of a loyalty calculator that may be utilized, in whole or in part, in connection with one or more processes associated with creating new and/or reoccurring revenue sources may include one illustrated in FIG. 11. Customer instructions or selections may be communicated to a suitable server, such as, for example, a server associated with a pre-spending benefit entity using any suitable process or technique, such as a client-server process, as described above, for example, or other technique.

With regard to operation 706, based, at least in part, on customer instructions or selections, a pre-spending benefit entity may interact in some manner with a designated allocation source so as to verify or create, for example, a customer retail account, confirm an amount of allocated funds, debit or charge a retail account, transfer allocated funds, or the like, or any combination thereof. A pre-spending benefit entity may interact with an allocation source using any suitable transactional infrastructure, such as, for example, a payment card industry (PCI) compliant infrastructure, though claimed subject matter is not so limited. In some instances, an interaction may be facilitated or supported by an electronic network for financial transactions, such as the Automated Clearing House (ACH) network, for example, utilizing one or more electronic payment processing techniques. By way of example but not limitation, a PayPal™ account funded, for example, with an electronic debit from a customer's bank account via an ACH debit transfer may be employed or otherwise considered. Of course, details relating to a pre-spending benefit entity and/or allocation source interaction are merely examples, and claimed subject matter is not limited in this regard. It should be noted that, optionally or alternatively, customer instructions or selections may be communicated to a server associated with an allocation source, for example.

At operation 708, allocated funds may be transferred into a customer retail account that may be associated, for example, with a selected or designated retailer, such as Target, Starbucks, Costco, Chevron, Best Buy, or the like. A pre-spending benefit entity may collect appropriate fees, such as, for example, a processing fee, a technology licensing fee, a royalty fee, transaction fee, convenience fee, and/or the like in some manner, as referenced generally at operation 710. For example, a pre-spending benefit entity may deduct or withhold a certain amount from allocated funds and may forward the balance of funds to a designated retailer. Optionally or alternatively, a pre-spending benefit entity may assess an appropriate fee to a retailer, an allocation source, or, in some instances, a customer in connection with one or more associated transactions, in real-time or otherwise. A fee may be collected in connection with any suitable pricing structure and may comprise, for example, a flat fee that may be based, at least in part, on an agreement between a pre-spending benefit entity and a retailer, as one possible implementation. In some instances, a variable fee proportional, for example, to an amount allocated by a customer may be collected or otherwise assessed. Of course, these are merely examples of fees that may be collected or assessed, and claimed subject matter is not limited in scope in these respects.

With regard to operation 712, a suitable transaction record, such as, for example, a committed offer record reflecting an amount of allocated funds, particular deal, discount, goods or services, or other information with respect to a customer, retailer, or any other associated party may be generated in some manner. For example, a committed offer record may be generated by a pre-spending benefit entity concurrently with transferring allocated funds to a selected or designated retailer, just to illustrate one possible implementation. At operation 714, a suitable server (e.g., a pre-spending benefit entity, etc.) may communicate or otherwise facilitate or support a download of updated information using any suitable technique. For example, in some instances, a push-technology may be utilized, at least in part, so as to communicate information, transaction-related or otherwise, to be displayed on an application window of a mobile or other client device associated with a customer. Information may be displayed, in real-time or otherwise, using any suitable GUI associated with a mobile device and may include, for example, an allocated amount, current balance, transfer details, or the like. It should be noted that any suitable pull-technology so as to facilitate or support one or more updates on a client device, mobile or otherwise, may also be utilized. Likewise, a combination of push-technology and pull-technology may be employed in embodiments within the scope of claimed subject matter as well.

Figure 8:
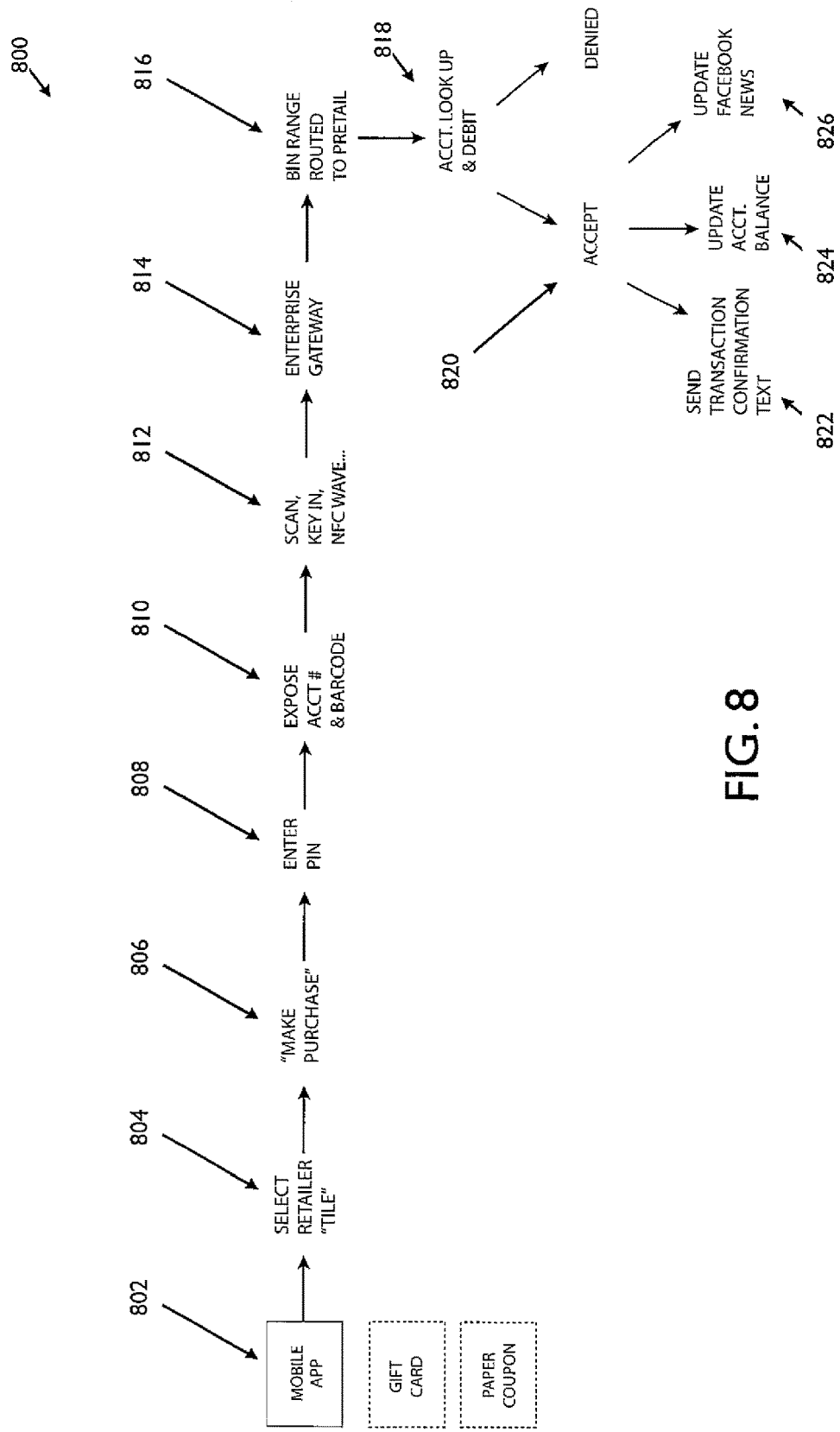
FIG. 8 is a flow diagram yet further illustrating particular features of an example process for creating new and/or reoccurring revenue sources.

FIG. 8 is a flow diagram further illustrating particular features 800 that may be present in an example process for creating new and/or reoccurring revenue sources, such as, for example, a process of making a purchase in connection with a promotional or offered deal. Likewise, it should be noted that information acquired or produced, such as, for example, input signals, applications, output signals, operations, results, etc. associated with example process 800 may be represented by one or more digital signals. It should also be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

An example process may begin at operation 802 with a customer utilizing any suitable transaction instruments in any stored value format at a point-of-purchase, point-of-interaction, or any other point of contact (e.g., check-out, etc.) associated with a retailer of interest. As previously mentioned, a customer may utilize, for example, an electronic coupon or certificate (e.g., via a mobile device, etc.), branded gift card, paper coupon, or like transaction instruments. As was also indicated, one or more transaction instruments may be associated with corresponding customer retail accounts and may comprise, for example, a cash equivalent reflecting an increased promotional retail value or loyalty-based discount offered by one or more retailers and redeemable within a respective transaction infrastructure. In one implementation, at operation 804, a customer may select a branded logo, icon, or "tile" corresponding to or representative of a particular participating retailer, such as, Starbucks, Costco, Chevron, Best Buy, Target, or the like, on an application window of a GUI associated with a mobile device. Again, certain functional features that may be implemented, at least in part, in connection with selecting a retailer of interest will be described in greater detail below.

With regard to operation 806, a customer may, for example, click on or touch a corresponding on-screen bar or tab to make or confirm a purchase in connection with a particular or offered deal, as will also be seen. In connection with making a purchase, a customer may, for example, be prompted to enter a personal identification number (PIN) for authentication or identity confirmation purposes, to gain access to a network or device, or the Like, as referenced at operation 808. Thus, an application window may comprise, for example, an editable combo-box or like combination of a drop-down menu and/or an input-line textbox, which may allow a customer to input or enter a PIN number and/or account information into an input line or to select one or more applicable options from a list of drop-down items. Once a PIN number is verified or accepted, upon or after, at operation 810, an account number may be unlocked and brought up on a display of a mobile device, for example, or otherwise exposed in some manner to a retailer along with an applicable barcode or like identifier. For example, an account and a barcode may be realized in the form of a suitable transactional instrument, such as a displayable electronic card or coupon, just to illustrate a few possible implementations. It should be appreciated that any suitable electronic token may be employed or otherwise considered, depending on a particular implementation. As used herein, "electronic token" may refer to an equivalent of any suitable electronic transactional instrument that may be utilized, in whole or in part, to validate one or more financial or like transactions between two or more parties, such as, for example, parties associated with example process 800. In some instances, an electronic token may include, for example, an electronic signature, digital stamp, digital currency or cash, electronic coin, electronic check, or the like, or any combination thereof. At operation 812, a barcode or like identifier may be scanned or read in some manner to facilitate or support one or more bank identification number (BIN) range routing processes with respect to an applicable account. For example, an exposed account or barcode may incorporate a BIN range to identify a pre-spending benefit entity so as to allow a retailer's payment gateway to electronically route account-related information for verification and/or approval to a suitable server, such as a server associated with a pre-spending benefit entity, as one possible implementation. A payment gateway may comprise any suitable platform that may facilitate or support secure electronic routing or otherwise sharing payment or like financial information between a number of special purpose computing platforms, such as platforms associated with a customer (e.g., a mobile device, etc.), retailer (e.g., a point-of-sale device, etc.), pre-spending benefit entity (e.g., a re-router, front-end or back-end server, etc.), an allocation source (e.g., a payment processor, etc.), or the like. Account BIN range routing techniques are known and need not be described here in greater detail.

It should be noted that any suitable technique may be utilized to read or input information in connection with one or more applicable transactions. For example, a mobile device may feature a near field communication (NFC) or like short-range wireless technology (e.g., RFID, etc.) allowing a customer or retailer to wave or place a mobile device in a sufficiently close proximity to a reader, NFC-enabled or otherwise, to input account-related information. Optionally or alternatively, account-related state or signal information may be entered manually or keyed-in, such as by a customer or retailer at a point-of-sale, for example, using a suitable input line or other controls on an application window of a GUI associated with a mobile device or point-of-sale device, as previously mentioned.

Utilizing any suitable electronic payment-enabled process, such as via an enterprise gateway, for example, suitable account-related information read or otherwise obtained in connection with a particular transaction may be routed to a suitable server, as indicated generally at operations 814 and 816, respectively. In one implementation, based, at least in part, on a BIN range, state or signal information may be routed to a server associated with a pre-spending benefit entity, though claimed subject matter is not so limited. At operation 818, an applicable account may be looked up and/or related information may be verified in some manner. For example, a server may be capable of performing a debit-type account-related verification in a binary format so as either accept or deny a particular transaction, as referenced generally at 820. Verification may be based, at least in part, on an amount of existing funds in an account, for example, or current account balance, just to illustrate one possible implementation. Claimed subject matter is not so limited, of course. It should be appreciated that any suitable account verification techniques or processes may be used.

If a transaction has been successfully completed, at operation 822, a digital receipt may be generated in some manner, such as by a pre-spending benefit entity, for example, and may be communicated to a client device, mobile or otherwise, as a form of confirmation. A receipt may also represent a security feature that may help to protect against unauthorized access to, use, etc. of customer funds, account, identity, or the like. For example, a server associated with a pre-spending benefit entity may generate and/or communicate a digital receipt in the form of an e-mail, text or short messaging service (SMS) notification, or the like that may be displayed on a screen of a mobile device after completion of an applicable transaction. By way of example but not limitation, a digital receipt may comprise "Transaction from account ending on 1234 in the amount of $130.50 has been successfully processed." It should be appreciated that other types or levels of security may be added or otherwise provided in connection with a process of making a purchase. For example, once a transaction confirmation is received, upon or after, an application window may prompt a customer to select an on-screen tab or bar to further confirm a particular amount, deal, to verify an account, etc., or any combination thereof within a certain limited time-frame (e.g., 1 minute, etc.). To illustrate, a customer may be presented, for example, with one or more selectable on-screen buttons with an option to confirm or deny a transaction, to report a fraudulent activity or unauthorized access to an account, if suspected, to freeze an account, or the like. Of course, these are merely examples relating to one or more levels of security that may be implemented, and claimed subject matter is not so limited.

At operation 824, after confirming a transaction, a suitable server, such as a server associated with a pre-spending benefit entity, for example, may communicate and/or download updated account-related information (e.g., balance, etc.) onto a specific employee device, mobile or otherwise, for display of respective updates. With regard to operation 826, a server may broadcast, publicize, or otherwise distribute in some manner suitable information, transaction-related or otherwise, so as to facilitate or support connection or collaboration among one or more customers, retailers, entities, etc., to create brand or entity awareness, or the like. In one implementation, information may, for example, be distributed in the form of a status update or like feature via any suitable communications channel or media platform, such as a media platform associated with a social network. Information may be communicated to one or more members of a network via instant messaging, SMS or Multimedia Messaging Service (MMS) notifications, e-mail, or the like. Optionally or alternatively, information may be posted or otherwise displayed on a retailer, customer, entity, etc. homepage associated with a media platform for others to view, if desired. Thus, in an implementation, a specific client device, mobile or otherwise, may be capable of subscribing to a communications channel or media platform using any suitable processes or techniques. For example, a specific client device may comprise an application programming interface (API) allowing a customer to connect or otherwise share information with designated parties, such as members of a social network, friends, followers, etc. via any suitable communications channel. By way of example but not limitation, a Facebook Connect API may be utilized, at least in part, to allow customers to post or communicate updates to their Facebook profile or homepage using their Facebook identity. Claimed subject matter is not so limited, of course.

As a way of illustration, a media platform may include Twitter, Jaiku, Tumblr, Plurk, Beeing, just to name a few examples. In addition, social networking platforms, such as Facebook, MySpace, LinkedIn, XING, etc. featuring an aspect or component allowing users, for example, to broadcast, publicize, or otherwise distribute information may also be utilized, as alluded to previously. By way of example but not limitation, a status update or like message may include "I paid 25% less for my Starbucks latte using Pretail.com" or "Michael Lenahan just saved 15% at Target using Pretail." In this illustrated example, "Pretail.com" or "Pretail" may refer to an example business entity that may be representative of or associated with, in whole or in part, a pre-spending benefit entity, though claimed subject matter is not so limited. A customer, retailer, etc. may be provided with an option to "opt in" or "opt out" of broadcasting, publicizing, or otherwise distributing information, transaction-related or otherwise, on a media platform. It should also be noted that operation 826 may be optional in some implementations.

FIGS. 9A-9F are illustrative representations of an embodiment of an application window comprising a GUI associated with a specific client device, such as a mobile device 900, for example, realized as a smart telephone. These figures may illustrate certain functional features that may be implemented in connection with an example process for creating new and/or reoccurring revenue sources, such as process 100 of FIG. 1, for example, if a pre-spending benefit entity associates or engages, in whole or in part, an allocation source. It should be noted that even though respective figures may illustrate one or more example progressions in connection with allocating funds, selecting a retailer, purchasing a deal, routing a payment, or the like, claimed subject matter is not limited to these one or more example progressions, allocations, selections, or the like.

As seen in FIG. 9A, mobile device 900 may comprise, for example, an application window 902 as a GUI for a special purpose computing platform allowing a customer to view, manage, or otherwise manipulate visual content in connection with selecting one or more retailers, allocating funds, making purchases, or the like. A customer may execute instructions for one or more resident or host applications via a touch screen, display, etc. so as to bring up, for example, a list of participating retailers, offered deals or promotions, etc. on application window 902. A customer may browse through and may select a retailer or applicable deal via one or more on-screen tabs or "tiles," indicated generally at 904, to initiate one or more transactions of interest. Based, at least in part, on customer selection, a special purpose computing platform comprising or otherwise associated with mobile device 900 may implement one or more operations or processes for creating new and/or reoccurring revenue sources, as previously mentioned. To illustrate, a customer may allocate funds towards a particular retailer of interest, such as via one or more operations of example process 700 of FIG. 7, for example, by selecting a tab or "tile" 906. Similarly, a customer may instruct mobile device 900 to implement one or more operations in connection with making a purchase, such as one or more operations of example process 800 of FIG. 8, by clicking on or touching, for example, a corresponding tab or "tile" 908 on application window 902. Of course, details relating to one or more retailers, offered deals, accounts, balances, or GUI are merely illustrative examples, and claimed subject matter is not so limited.

FIG. 9B is a representation of an application window, such as application window 902 of mobile device 900, for example, which may result from a customer's selection of a particular retailer or deal of interest (e.g., via tab 906, etc.). As illustrated, using application window 902, a customer may be able to view an offered deal (e.g., $215.00, etc.)

representing a pre-payment loyalty reward that may reflect an added or increased promotional retail value (e.g., +10%, etc.) over a face or retail value (e.g., $195.00, etc.), if purchased within a certain time period (e.g., today, etc.). As was indicated, an increased promotional retail value may be calculated or determined based, at least in part, on a suitable loyalty calculator, such as a loyalty calculator illustrated in FIG. 11, for example. It should be noted that any suitable promotional or pricing strategies may be utilized. For example, a retailer may offer an opportunity to select a suitable amount of funds a customer may be willing to pre-pay or allocate by listing or presenting a range of increased promotional values in connection with allocation amounts. To illustrate, the higher an amount of funds to be allocated, the greater a promotional value or discount a retailer may offer or a customer may obtain, as one possible example. Another possible approach may account for a frequency of allocations with respect to a particular retailer, brand, customer, or the like. As such, a customer may be offered flexible or dynamically-priced loyalty reward rates that may correspond, for example, to a customer's willingness to pay up-front for goods or services. Having selected an amount of funds to be allocated, a customer may choose a suitable allocation source, such as a PayPal™ account, for example, via an on-screen tab or bar 910, and may purchase a deal of interest by touching or clicking on a corresponding bar, as referenced at 912. It should be appreciated that a promotional value or discount associated with a purchased deal, loyalty offer, etc. may or may not expire, which may depend, at least in part, on a particular retailer, pre-spending benefit entity, customer, application, or the like, or any combination thereof.

In some instances, a retailer, pre-spending benefit entity, etc. may integrate one or more strategic approaches or contingency models to facilitate or support one or more marketing objectives, such as, for example, an objective of retaining existing customers through one or more offered incentives. In one implementation, a strategic approach or model may comprise, for example, a game theory or like incentive-based principle or approach that may reward a continued loyalty of a customer, though claimed subject matter is not so limited. For example, as generally illustrated by an arrow at 914, application window 902 may include one or more dynamic information fields providing a customer with information comprising one or more options to renew a deal of interest at a greater promotional value or discount once (e.g., upon or after, etc.) one or more conditions are satisfied. By way of example but not limitation, one or more conditions may comprise, for example, spending a designated balance by a certain date, renewing a particular deal within a certain period of time (e.g., within next 30 days, etc.), or the like. Claimed subject matter is not so limited to an allocation source, deal, or options shown, of course.

Figure 9D:
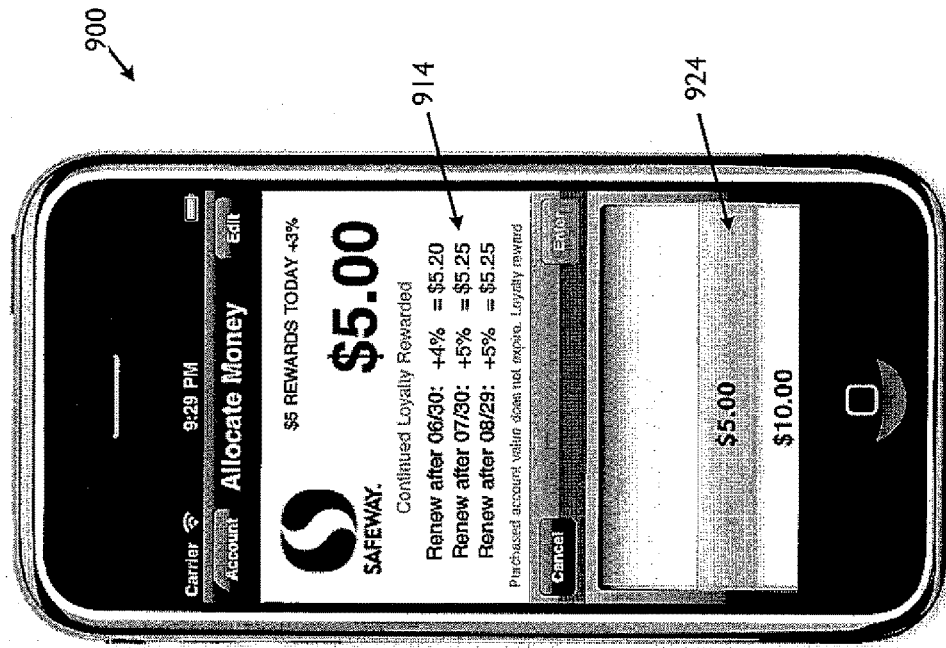
Figure 9C:
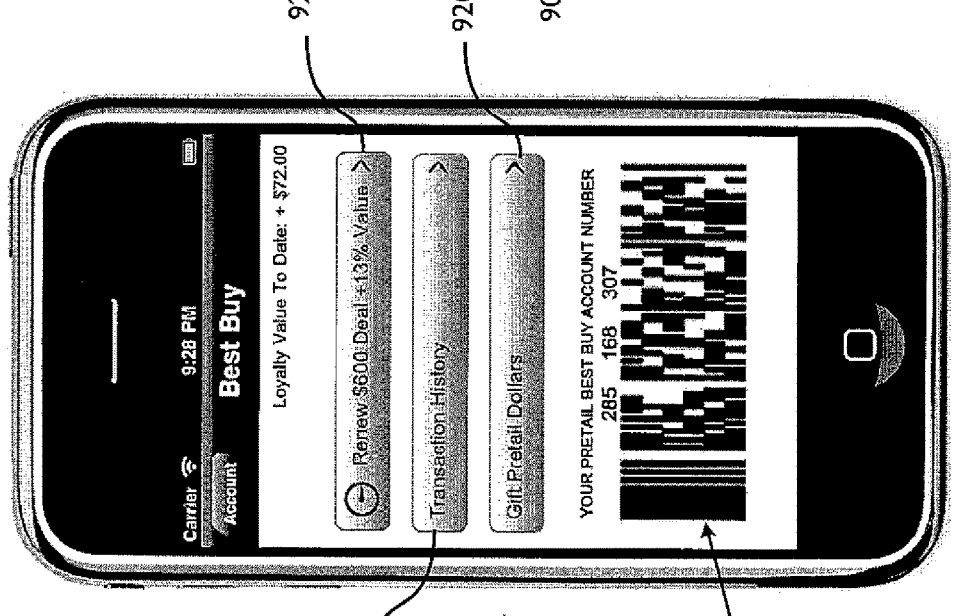

FIG. 9C is a representation of application window 902 of mobile device 900, which may result from a customer's unlocking an account by entering a PIN number in connection with a process of making a purchase, such as process 800 of FIG. 8, for example. As seen, application window 902 may include visual content comprising, for example, a dynamic information field 916 realized as a displayable electronic coupon or card referencing an example account number (e.g., 285 168 307, etc.) for a customer enrolled or registered with a pre-spending benefit entity (e.g., Pretail, etc.) in connection with a particular retailer (e.g., Best Buy, etc.) and an exposed optical barcode, just to illustrate one possible implementation. As previously mentioned, an account and/or barcode may incorporate or reference a BIN range to identify a pre-spending benefit entity so as to facilitate or support one or more processes in connection with routing of account-related state or signal information for verification and/or approval. In some instances, visual content may be rendered by an application, such as an electronic banking or processing application associated with a suitable electronic transactions network, such as the ACH network, for example, and residing on mobile device 900. Optionally or alternatively, visual content may be rendered by a network browser that may receive information from a suitable network server, such as, for example, a server associated with a pre-spending benefit entity, retailer, etc., or any combination thereof, as was also indicated.

As also illustrated, a customer may access an applicable transaction history via a corresponding selectable tab or bar 918, for example, or may purchase a gift for someone else by selecting a tab or bar 920. A customer may, for example, purchase a gift by allocating a certain amount of funds towards a particular retailer of interest using one or more techniques described above. Based, at least in part, on customer gift instructions, a retailer, pre-spending benefit entity, or any other suitable party may send a transactional instrument representing a purchased gift to a designated gift recipient or customer in any suitable stored value format, such as a branded gift card, electronic certificate, paper coupon, or the like. A customer may also be capable of renewing a particular offered deal with a greater value (e.g., $600 Deal+13%, etc.) by selecting an option via a tab or bar 922, for example, which may prompt a customer to satisfy one or more conditions, as will be described in greater detail below.

FIG. 9D is a representation of application window 902 of mobile device 900 further illustrating certain functional features that may be implemented in connection with a process of making a purchase, such as process 800 of FIG. 8, for example, in which a customer's loyalty may be rewarded at a time of payment, real-time or otherwise. For example, a customer may be offered an opportunity to select one or more deals at a point-of-purchase or point-of-interaction, which may reflect one or more increased promotional values or discounts that may be based, at least in part, on an in-store-allocated loyalty pre-payment. As used herein, "in-store-allocated loyalty pre-payment" may refer to a form of pre-payment in which funds are allocated as part of or as a result of a purchasing behavior of a customer with respect to a particular retailer or store. In some instances, an in-store-allocated loyalty pre-payment may comprise, for example, or otherwise be determined based, at least in part, on a customer's purchase history, purchase frequency, or the like, or any combination thereof. Likewise, an in-store-allocated loyalty pre-payment may comprise, for example, or otherwise be determined based, at least in part, on a retailer's desire to modify customer purchasing behavior, at least in part, or to otherwise elicit a particular customer purchasing behavior or pattern, again, at least in part. Thus, a customer may be presented (e.g., at a point-of-sale, check-out, etc.) with one or more selectable state or signal information fields, such as, for example, a field realized herein as a spinning tab or spinner 924, from which a customer may select a promotional deal of interest (e.g., $5.00, $10.00, etc.) that may be offered by a particular retailer (e.g., Safeway, etc.). As seen, a deal may be offered in connection with an in-store-allocated loyalty pre-payment-based reward that may reflect an added or increased promotional retail value or discount (e.g., +3%, etc.) over a face or retail value (e.g., $5.00, etc.), if taken advantage of within a certain time period (e.g., today, etc.). As such, this may add a dynamic promotional opportunity to a retailer, pre-spending benefit entity, or the like by advantageously providing a platform to communicate with loyal customers, in real time or otherwise, such as at a time or purchase, for example, and/or reward customers who purchase goods or services on a continual basis, and/or at least approximately in accordance with a desired purchasing behavior or patterns, again, at least in part.

FIGS. 9E and 9F are representations of application window 902 of mobile device 900, which may be implemented, at least in part, in connection with a suitable strategic approach or objective, such as, for example, a game theory or like incentive-based principle that may reward a continued loyalty of a customer in some manner. As seen in FIG. 9E, a customer may be offered an option, such as via selectable tab or bar 922, for example, to renew one or more deals of interest (e.g., $600.00, etc.) at a greater promotional value or discount (e.g., +13%, etc.) once (e.g., upon or after, etc.) one or more conditions are satisfied. One or more conditions may comprise, for example, spending a designated balance by a certain date, renewing a particular deal within a certain period of time, or the like, as previously mentioned. In some instances, a selectable tab or button for renewing a deal of interest may be displayed or presented as a ticking clock icon in a "locked" or "grayed-out" fashion, for example, so as to communicate to a customer that the deal represents a time-bound opportunity and/or may be purchased once (e.g., upon or after, etc.) one or more conditions are satisfied. This may, for example, encourage continued customer participation or loyalty, provide an incentive or motivation to purchase deals with greater promotional values or discounts, or otherwise provoke customer curiosity with respect to one or more promotional offers.

If a customer selects an option to renew a deal, such as via tab or bar 922, for example, a pop-up window 926 may appear, as illustrated in FIG. 9F. Pop-up window 926 may comprise, at least in part, a text box displaying state or signal information explaining or describing a condition in connection with unlocking an offered deal, for example. Text box information may include, for example, an offer expiration date, qualifying transaction (e.g., making a purchase, gifting, etc.), qualifying amount (e.g., a balance of the last deal, etc.), just to name a few examples. As also seen, application window 902 may prompt a customer to unlock an offered deal by performing an applicable transaction via a tab or bar 928, if desired. Application window 902 may also comprise one or more information fields, such as a dynamic field 930, for example, that may provide account-related or other state or signal information, such as an account balance (e.g., $84.37, etc.), loyalty value to date (e.g., +72.00, etc.), or the like with respect to a retailer of interest (e.g., Best Buy, etc.). It should be appreciated, however, that details illustrated in connection with application window 902 are merely examples, and that claimed subject matter is not limited in this regard.

Figure 10:
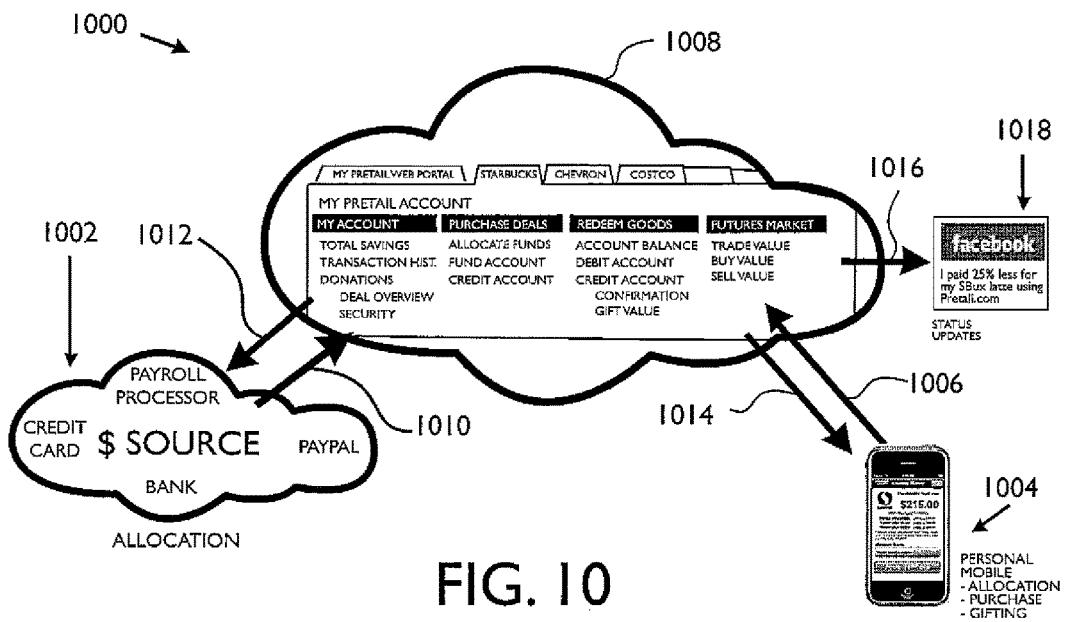
FIG. 10 is a schematic representation of a flow diagram illustrating a summary of yet example process for creating new and/or reoccurring revenue sources.

FIG. 10 is a schematic representation of a flow diagram illustrating a summary of an example process 1000 for creating new and/or reoccurring revenue sources if, for example, a pre-spending benefit entity associates or engages, in whole or in part, an allocation source. To initiate a process, a customer may purchase a deal of interest by selecting, for example, a participating retailer, promotional deal, designating an allocation source 1002, etc. using any suitable process or technique. As previously mentioned, a customer may, for example, utilize an application window comprising a GUI associated with a mobile device 1004 capable of accessing the Internet or like network, though claimed subject matter is not so limited. As illustrated generally by an arrow at 1006, customer instructions regarding a deal of interest may be communicated in some manner to a suitable server, such as a server associated with a pre-spending benefit entity 1008, for example. As was indicated, pre-spending benefit entity 1008 may facilitate or support a transaction in connection with customer instructions by associating or engaging, for example, designated allocation source 1002, as referenced generally by an arrow at 1010. Allocation source 1002 may perform one or more operations in connection with customer instructions, such as, for example, verifying transactional account or payment, allocating or transferring funds, generating a transaction record, or the like. Allocation source 1002 may communicate suitable transaction-related state or signal information (e.g., a transaction receipt, etc.) to pre-spending benefit entity 1008, as indicated generally by an arrow at 1012. Once (e.g., upon or after, etc.) information is received, pre-spending benefit entity 1008 may perform one or more applicable tasks, such as creating a new retail account, updating a customer's retail account with suitable information, generating a committed offer record, generating or issuing a barcode or like transaction identifier, etc. At operation 1014, pre-spending benefit entity 1008 may communicate suitable information to mobile device 1004 via a push-technology or like feature, as previously mentioned. Information may be displayed, in real-time or otherwise, on an application window of mobile device 1004 and may include, for example, an account balance, account number, barcode, or the like. As indicated generally at 1016, in some instances, a status update or like message may be posted or otherwise featured within any suitable communications channel or media platform 1018, such as Facebook, for example, so as to publicize desired information, transaction-related or otherwise.

Figure 11:
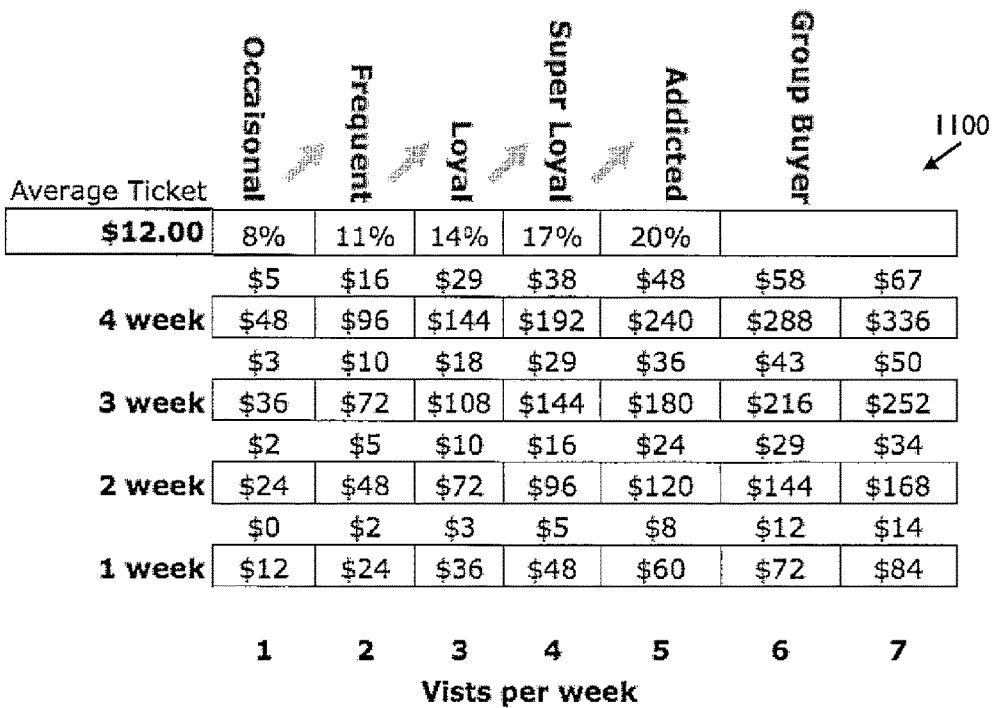
FIG. 11 is an implementation of an example loyalty calculator.

FIG. 11 is an implementation of an example loyalty calculator 1100 that may be electronically applied or otherwise considered, at least in part, to determine a level of customer loyalty and/or applicable discount in connection with one or more operations for creating new and/or reoccurring revenue sources. Loyalty calculator 1100 may, for example, help a retailer, pre-spending benefit entity, etc., or any combination thereof to potentially increase customer wallet-share via new or repeat business, more definitively forecast customer spend, strengthen customer loyalty, or the like, while preventing or reducing instances of customers' manipulating, cheating, or otherwise "gaming the system." One possible instance of "gaming the system" may include, for example, a customer allocating funds at a point-of-purchase to obtain a one-time deal or discount for a particular good or service of interest, such as after seeing such a good or service at a retailer, on-line, etc. As illustrated, example loyalty calculator may be based, at least in part, on an average ticket size-type metric, though claimed subject matter is not so limited. Typically, although not necessarily, "average ticket size" may refer to a marketing tool or metric representative of an average dollar amount spent by a particular customer at a particular retailer. In some instances, an average ticket size-type metric may also account, for example, for a time period, such as between pre-payments or allocations of funds. It should be appreciated that an average ticket size may, for example, be represented in connection with an applicable percentage-based discount with respect to a loyalty reward that may correlate with a purchase value determined or set by a retailer. Claimed subject matter is not so limited, of course.

As illustrated, based, at least in part on an example average ticket size of $5, if a customer makes a purchase or visits a particular retailer (e.g., a coffee shop, etc.) twice a week for four weeks, for example, then a level of customer loyalty may correspond to "Frequent" and may reflect an 11% reward value a retailer may be willing to offer. As another example, for a "Super Loyal" customer who makes purchases four times per week for four weeks (e.g., spends on average $192, etc.), for example, a retailer may be willing to offer 17% as a loyalty discount. As also seen, six or more visits per week for a number of weeks may, for example, indicate that a customer more likely comprises a group buyer rather than an individual buyer, wherein a suitable group buyer discount may be applied. Of course, this is merely one possible example of a loyalty calculator that may be utilized, at least in part, to determine a level of customer loyalty or applicable discount, and claimed subject matter is not limited in this regard.

Figure 12:
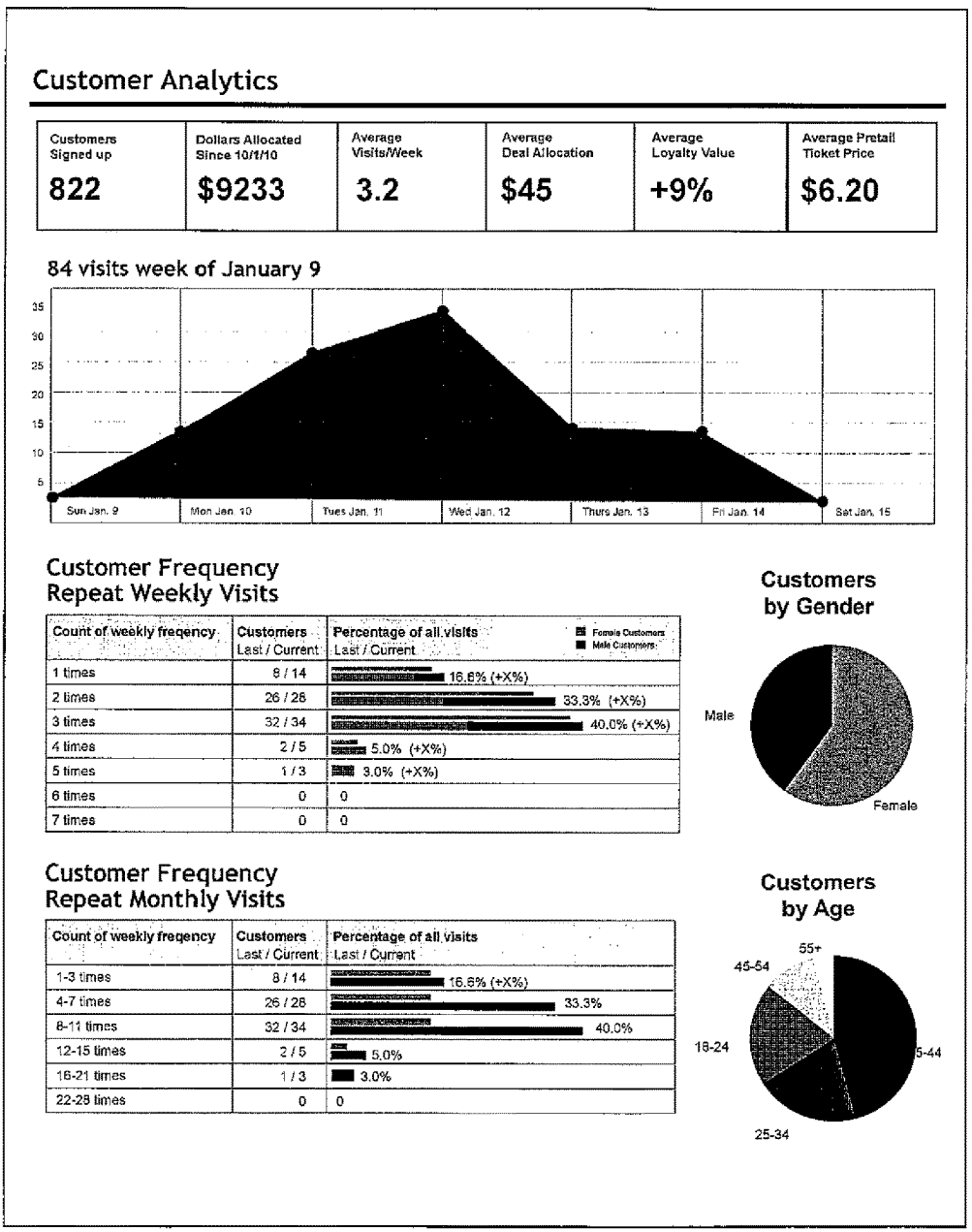
FIG. 12 illustrates example consumer-related information.

In an implementation, suitable customer-related information may be generated or gathered in some manner, such as in connection with an example process for creating new and/or reoccurring revenue sources, for example, and may be utilized, in whole or in part, as an effective marketing tool helping to assess customer behavior, perform predictive analytics, improve customer relationships, or the like. Customer-related information may, for example, be generated, at least in part, by a pre-spending benefit entity, allocation source, retailer, etc., or any combination thereof. By way of example but not limitation, customer-related information may include an example illustrated in FIG. 12. As seen, customer-related information may, for example, be represented, at least in part, via a dashboard 1202 that may be provided by a pre-spending benefit entity (e.g., Pretail, etc.) to or in connection with a particular retailer. In some instances, customer-related information may comprise, for example, information with respect to customer demographics, purchase frequency and/or spend, purchase history, or the like in connection with one or more retailers, brands, products, etc. It should be noted that any suitable numbering or serialization technique, such as, for example, stock-keeping unit (SKU)-type or like technique to sufficiently identify goods or services with respect to one or more retailers may be employed. It should be appreciated that customer-related state or signal information shown or dashboard 1202 is merely an example to which claimed subject matter is not limited.

FIGS. 13 and 14 illustrate examples of loyalty-based reward calculations, such as, for example, a prepaid retail consumer loyalty rewards value calculation and an in-store-allocated loyalty pre-payment loyalty rewards calculation, respectively. As previously mentioned, loyalty-based reward calculations may be used, in whole or in part, to determine a level of customer loyalty and/or applicable discount in connection with one or more operations for creating new and/or reoccurring revenue sources. Example calculations may be applied or performed electronically in connection with any suitable loyalty calculator, such as, for example, loyalty calculator 1100 of FIG. 11. Information used, acquired, or produced, such as, for example, input signals, output signals, operations, results, etc. associated with example calculations may be represented by one or more digital signals. As illustrated in FIG. 13, a total consumer loyalty reward value for a prepaid retail, for example, may be calculated by combining an amount of prepaid retail-based payment (e.g., $100, etc.) with a loyalty reward value (e.g., 12%, etc.) derived from a pre-paid amount, which may yield a total consumer value (e.g., $112, etc.) that may be greater than an amount of consumer pre-payment (e.g., $100, etc.). With respect to FIG. 14, a total consumer in-store-allocated loyalty reward value may be determined, for example, by combining an amount of an in-store-allocated loyalty pre-payment with a loyalty reward value (e.g., 12%, etc.) derived from an amount of an in-store-allocated loyalty pre-payment (e.g., at a check-out, etc.) so as to arrive at a total consumer value (e.g., $112, etc.) that may be greater than an in-store-allocated loyalty pre-payment amount (e.g., $100, etc.). Of course, these are merely a few possible examples of loyalty-based reward calculations, and claimed subject matter is not so limited.

FIGS. 15-29 illustrate various example loyalty rewards-based approaches or models, such as prepaid retail loyalty rewards-based approaches or models and/or in-store-allocated loyalty pre-payment rewards-based approaches or models, for example, that may be utilized, at least in part, to determine one or more loyalty reward values. Again, it should be appreciated that information used, acquired, or produced, such as, for example, input signals, output signals, operations, results, etc. associated with example loyalty rewards-based approaches may be represented by one or more digital signals. For example, a loyalty reward value may be represented by one or more digital signals representative of a percentage and/or currency amount-based discount applicable to a particular consumer, purchase, deal, account, or the like, though claimed subject matter is not so limited. Optionally or alternatively, a loyalty reward value may be realized, for example, as a total returned consumer value (e.g., a percentage, currency amount, etc.) reflecting one or more applicable discounts. As previously mentioned, one or more loyalty rewards-based approaches or models may be implemented in connection with any suitable loyalty calculator.

FIG. 15 illustrates a prepaid retail loyalty rewards-based approach or model that may be applied, at least in part, to a consumer with a relatively frequent or consistent purchasing behavior that may include, for example, repeat daily or weekly-type purchases. An approach or model may be advantageously utilized by a retailer providing goods or services that consumers may purchase somewhat frequently, such as on a daily or weekly basis, for example. By way of example but not limitation, goods or services may include groceries, drug store-related items, gasoline-related purchases, convenience markets or restaurant-type purchases, or the like, though claimed subject matter is not so limited FIG. 16 illustrates a prepaid retail loyalty rewards-based approach or model that may be applied, at least in part, to a consumer with relatively regular purchasing behavior that may include, for example, repeat monthly-type purchases. An approach or model may be advantageously utilized by a retailer providing goods or services that consumers may purchase somewhat regularly but not a daily basis. By way of example but not limitation, goods or services may include certain groceries, pet supplies, casual dining, clothing, department store-related items, home improvement-related purchases, office supplies, or the like, though claimed subject matter is not so limited.

FIG. 17 illustrates a prepaid retail loyalty rewards-based approach or model that may be applied, at least in part, to a consumer with a purchasing behavior that may include, for example, purchases made multiple times per year. An approach or model may, for example, be advantageously utilized by a retailer providing goods or services that consumers may purchase a several times per year. By way of example but not limitation, goods or services may include some department store-related items, appliances, computer and/or electronics, sporting goods, travel or leisure-related purchases, automobile-related purchases, or the like, though claimed subject matter is not so limited.

FIG. 18 illustrates a prepaid retail loyalty rewards-based approach or model that may be applied, at least in part, to a consumer that may be prone to purchasing goods or services in connection with one or more offered time-based incentives. An approach or model may, for example, be advantageously utilized by a retailer that may find it desirable or suitable to drive business within a specific time frame or window, such as by the end of the day, week, month, quarter, or the like. For example, a particular time-based incentive window, such as next 12 hours, 3 days, etc. may be used, though claimed subject matter is not so limited.

FIG. 19 illustrates a prepaid retail loyalty rewards-based approach or model that may be combined with a repeat allocation commitment approach, for example, to calculate a loyalty reward value. By way of example but not limitation, a repeat allocation commitment may comprise a monthly allocation of a certain dollar amount over a specific time frame, such as $100 for 6 months, just to illustrate one possible implementation. An approach or model may, for example, be advantageously utilized by a retailer that may find it desirable or suitable to incentivize a customer and/or drive repeat business within a specific time frame. Claimed subject matter is not so limited, of course.

FIG. 20 illustrates a prepaid retail loyalty rewards-based approach or model that may be combined with a repeat allocation commitment approach, for example, to calculate a loyalty reward value. For this approach or model, a renewal of commitment may add a multiplier so as to incentivize consumers to review and/or yield greater loyalty value. For example, first loyalty reward may return an X amount of added value. If a consumer renews, such as within a certain time window, a greater loyalty reward may be provided (e.g., $X+$Y, etc.). Claimed subject matter is not limited to this particular illustration, of course.

FIG. 21 illustrates a prepaid retail loyalty rewards-based approach or model that may be combined with a repeat allocation commitment, frequency, and/or duration and may be calculated against an influence score to arrive at loyalty reward value. Adding an influence score derived from a size of a consumers' social graph or network (e.g. Facebook, Twitter, etc.) may influence one or more consumer purchases and/or a loyalty reward. By way of example but not limitation, influence score of 200 friends may, for example, yield a different loyalty value vs. that of someone with a higher influence score, such as 2,000 friends. Of course, claimed subject matter is not so limited.

FIG. 22 illustrates a prepaid retail loyalty rewards-based approach or model that may be combined with a market condition variable of non-peak or seasonality (e.g., frozen smoothies being sold in winter, etc.) to calculate a loyalty reward value. A retailer may, for example, utilize an approach to incentivize one or more consumers and/or drive repeat business during non-peak times or seasons.

FIG. 23 illustrates an in-store-allocated loyalty pre-payment-based approach or model that may be applied, in whole or in part, to calculate a loyalty reward value based, at least in part, on a consumer purchase history. A retailer may, for example, utilize an approach to reward one or more consumers for their loyalty and/or drive repeat business with an in-store allocation.

FIG. 24 illustrates an in-store-allocated loyalty pre-payment-based approach or model that may use a consumer's purchase history and/or purchase frequency to calculate a loyalty reward value. A retailer may, for example, utilize an approach to reward one or more consumers for their loyalty and/or drive repeat business with an in-store allocation.

FIG. 25 illustrates an in-store-allocated loyalty pre-payment-based approach or model that may use a consumer's purchase history and/or a specific time window to calculate a loyalty reward value. A retailer may, for example, utilize an approach to reward one or more consumers for their loyalty and/or drive business within a specific date and/or time in connection with an in-store allocation.

FIG. 26 illustrates an in-store-allocated loyalty pre-payment-based approach or model in which an amount of in-store allocation may be used, at least in part, to calculate a loyalty reward value. A retailer may, for example, utilize an approach to reward one or more consumers for spending a specific amount during a particular visit in connection with an in-store allocation.

FIG. 27 illustrates an in-store-allocated loyalty pre-payment-based approach or model in which an amount of in-store allocation may be combined with a time limitation to calculate a loyalty reward value. A retailer may, for example, utilize an approach to reward one or more consumers for spending a specific amount and/or drive business within a specific date and/or time in connection with an in-store allocation.

FIG. 28 illustrates an in-store-allocated loyalty pre-payment-based approach or model in which an amount one or more consumers state they may be willing to purchase at a retailer within a given time frame may be used, at least in part, to calculate a loyalty reward value. By way of example but not limitation, if a consumer pays in-store for a particular restaurant and ends up enjoying it, a consumer may pre-pay or allocate funds for future visits and may obtain a loyalty discount. A deal or offer may comprise a time-limited deal or offer, for example, which a customer may timely renew, or otherwise an offered value may erode over time, gradually or otherwise (e.g., pre-pays within 24 hours after spend, gets X % deal). At 48 hours post-spend, an offer may erode slightly (e.g., X %–Y %, etc.), for which a loyalty reward value calculation may account, for example. It should be appreciated that claimed subject matter is not limited to such an example illustration.

FIG. 29 illustrates an in-store-allocated loyalty pre-payment-based approach or model in which an amount one or more consumers state they may be willing to purchase at a retailer with consideration for market condition, such as seasonality, for example, may be used, at least in part, to calculate a loyalty reward value. A retailer may, for example, utilize an approach to incentivize one or more consumers and/or drive repeat business during non-peak times or seasons.

Thus, as illustrated in various example implementations and/or techniques presented herein, in accordance with certain aspects, a method may be provided for use as part of a special purpose computing device and/or other like machine that accesses digital signals from memory and processes such digital signals to establish transformed digital signals which may be stored in memory, such as in the form of digital or logical states, as part of one or more data or information files and/or a database specifying and/or otherwise associated with an index, for example.

Some portions of the detailed description which preceded were presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. in this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

According to an implementation, one or more portions of an apparatus, such as second device 604, for example, may store one or more binary digital electronic signals representative of information expressed as a particular state of a device, here, second device 604. For example, an electronic binary digital signal representative of information may be "stored" in a portion of memory 610 by affecting or changing a state of particular memory locations, for example, to represent information as binary digital electronic signals in the form of ones or zeros. As such, in a particular implementation of an apparatus, such a change of state of a portion of a memory within a device, such a state of particular memory locations, for example, to store a binary digital electronic signal representative of information constitutes a transformation of a physical thing, here, for example, memory device 610, to a different state or thing.

While certain example techniques have been described and/or shown herein using various methods and/or systems, it should be understood by those skilled in the art that various other modifications may be made, and/or equivalents may be substituted, without departing from claimed subject matter.

Additionally, many modifications may be made to adapt a particular situation to the teachings of claimed subject matter without departing from one or more central concepts, such as have been described herein. Therefore, it is intended that claimed subject matter not be limited to particular examples disclosed, but that such claimed subject matter may also include all implementations falling within the scope of the appended claims, and/or equivalents thereof.

What is claimed is:

1. A method comprising:

obtaining, by a computing device of a user, transaction data related to a plurality of transactions made by the user in which each transaction is with respect to one of a plurality of providers of goods or services;

transmitting, by the computing device, the transaction data to a pre-payment benefit entity;

initiating, by the computing device, a log-in process with respect to the pre-payment benefit entity;

receiving, by the computing device from the pre-payment benefit entity in response to initiation of the log-in process, a purchase history with respect to the plurality of providers that is based on the transaction data;

receiving, by the computing device from the pre-payment benefit entity in response to initiation of the log-in process, promotional information regarding a plurality of promotions that each correspond to one of the plurality of providers, each of the plurality of promotions indicating a corresponding promotional value to be added to a prepayment value in exchange for the user committing to allocate funds on a scheduled basis through a payroll deduction to prepay future purchases with a corresponding provider via a prepayment account associated with the user;

populating dynamic information fields of a user interface of the computing device with the purchase history and the promotional information such that the user interface presents the purchase history and the plurality of promotions according to corresponding providers in a manner that allows the user to identify purchase patterns with respect to the plurality of providers and in a manner that allows the user to select one or more of the plurality of promotions;

receiving, via the user interface, a selection, by the user from the plurality of promotions, of a promotion associated with a particular promotional value for a particular provider;

electronically communicating, using a hardware processor, the selection of the promotion by the user to the pre-payment benefit entity;

causing an amount corresponding to the prepayment value to be electronically transferred to the prepayment account associated with the user to pre-pay for future purchases with the particular provider, the prepayment value and the particular promotional value being combined in the prepayment account for future payments with the particular provider to increase a total value in the prepayment account;

electronically receiving a scannable code associated with the prepayment account, the scannable code being generated and transmitted by the pre-payment benefit entity, the scannable code comprising account-related information associated with the prepayment account and routing information to a server associated with the prepayment account;

causing a payment gateway of the particular provider to electronically route, using the routing information, the account-related information to the server associated with the prepayment account to redeem the promotion by presenting the scannable code to the payment gateway;

providing, in response to redemption of the promotion by the user, subsequent transaction data related to purchases determined to be made by the user with respect to the particular provider subsequent to redemption of the promotion; and presenting, on the user interface, a subsequent promotion that is associated with the particular provider and that is based on a level of customer loyalty determined with respect to the particular provider based on the subsequent transaction data.

2. The method of claim 1, wherein the selection originated at a special purpose computing platform device comprising a specific client device operated by the user.

3. The method of claim 2, wherein the specific client device comprises a mobile device operated by the user.

4. The method of claim 2, wherein the specific client device is coupled to a network accessible by the provider of goods or services and by the pre-payment benefit entity that manages offering of the promotion.

5. The method of claim 2, wherein the specific client device is coupled to a network associated with the provider of goods or services via a network associated with the pre-payment benefit entity.

6. The method of claim 1, further comprising receiving an indication of an allocation source that manages an account corresponding to the user from which the amount corresponding to the prepayment value is electronically transferred.

7. A method comprising:
 causing, by a hardware processor, a user interface to be presented on a computing device of a consumer, the user interface offering a plurality of promotions each corresponding to one of a plurality of providers of goods or services;
 receiving a selection, from the computing device of the consumer, of a promotion from the plurality of promotions presented on the user interface, the promotion offering a promotional value to be added to a prepayment value in exchange for the consumer committing to allocate funds on a scheduled basis to prepay future purchases with a particular provider that corresponds to the selected promotion in which prepayment of future purchases with the particular provider is via a prepayment account associated with the consumer;
 causing a transfer of an amount corresponding to the prepayment value to the prepayment account associated with the consumer in response to the receiving of the selection of the promotion, the prepayment value and the promotional value being combined in the prepayment account for future payments with the particular provider to increase a total value in the prepayment account;
 generating a scannable code associated with the prepayment account, the scannable code comprising account-related information associated with the prepayment account and routing information to a server associated with the prepayment;
 transmitting the scannable code to the computing device of the consumer for presentation on a display of the computing device, presentation of the scannable code by the computing device of the consumer to a payment gateway of the particular provider causing the payment gateway to electronically route, using the routing information, the account-related information to the server associated with the prepayment account to redeem the promotion;
 receiving, from the computing device of the consumer in response to redemption of the promotion by the consumer, subsequent transaction data related to purchases determined to be made by the consumer with respect to the particular provider subsequent to redemption of the promotion; and determining a subsequent promotion that is associated with the particular provider and that is based on a level of customer loyalty determined with respect to the particular provider based on the subsequent transaction data.

8. The method of claim 7, wherein an amount of the promotional value is based on an attribute of the prepayment value, the attribute comprising an incentive-based loyalty value.

9. The method of claim 8, wherein the incentive-based loyalty value is determined in connection with a selection from the group consisting of a prepaid retail loyalty rewards-based approach and an in-store-allocated loyalty pre-payment rewards-based approach.

10. The method of claim 7, wherein causing the transfer of the amount corresponding to the prepayment value comprises accepting, by a pre-spending benefit entity on behalf of the provider of goods or services, an electronic prepayment.

11. The method of claim 1, wherein the promotion further comprises a time period before the promotion expires.

12. The method of claim 1, wherein the promotion further comprises a renewal offer that increases the particular promotional value in response to the user renewing the selection of the promotion within a predetermined period of time.

13. The method or claim 1, wherein the particular promotional value is based on the level of customer loyalty.

14. The method of claim 13, wherein the level of customer loyalty is determined based on a loyalty calculator.

15. The method of claim 14, wherein the loyalty calculator is based on an average ticket size-type metric.

16. The method of claim 1, wherein the particular promotional value is contingent on satisfying one or more conditions.

17. The method of claim 1, wherein the prepayment value comprises an in-store-allocated loyalty pre-payment value.

18. The method of claim 17, wherein the in-store-allocated loyalty pre-payment value is based on a purchase history of the user.

19. The method of claim 17, wherein the in-store-allocated loyalty pre-payment value is based on a purchase frequency of the user.

20. The method of claim 1, wherein the prepayment value is electronically deducted from after-tax payments to the user by a payroll process.

21. The method of claim 7, wherein the promotion further comprises a time period before the promotion expires.

22. The method of claim 7, wherein the promotion comprises a renewal offer that increases the promotion value in response to the consumer renewing the selection of the promotion within a predetermined period of time.

23. The method or claim 7, wherein the promotional value is based on the level of customer loyalty.

24. The method of claim 23, wherein the level of customer loyalty is determined based on a loyalty calculator.

25. A non-transitory machine-readable storage medium storing instructions which, in response to being executed by one or more processors of a system, cause the system to perform operations comprising:
 obtaining, from a computing device of a user, transaction data related to a plurality of transactions made by a user in which each transaction is with respect to one of a plurality of providers of goods or services;
 obtaining, in response to initiation of a log-in process by the computing device, a purchase history with respect to the plurality of providers that is based on the transaction data;

communicating, to the computing device in response to initiation of the log-in process, promotional information regarding a plurality of promotions that each correspond to one of the plurality of providers, each of the plurality of promotions indicating a corresponding promotional value to be added to a prepayment value in exchange for the user committing to allocate funds on a scheduled basis through a payroll deduction to prepay future purchases with a corresponding provider via a prepayment account associated with the user;

causing dynamic information fields of a user interface of the computing device to be populated with the purchase history and the promotional information such that the user interface presents the purchase history and the plurality of promotions according to corresponding providers in a manner that allows the user to identify purchase patterns with respect to the plurality of providers and in a manner that allows the user to select one or more of the plurality of promotions;

electronically receiving, from the computing device, a selection of a promotion from the plurality of promotions by the user at a pre-payment benefit entity, the selected promotion being associated with a particular promotional value for a particular provider;

causing an amount corresponding to the prepayment value to be electronically transferred to the prepayment account associated with the user to pre-pay for future purchases with the particular provider, the prepayment value and the particular promotional value being combined in the prepayment account for future payments with the particular provider to increase a total value in the prepayment account;

generating a scannable code associated with the prepayment account, the scannable code comprising account-related information associated with the prepayment account and routing information to a server associated with the prepayment; and transmitting the scannable code to the computing device of the user for presentation on a display of the computing device, presentation of the scannable code by the computing device of the user to a payment gateway of the particular provider causing the payment gateway to electronically route, using the routing information, the account-related information to the server associated with the prepayment account to redeem the promotion.

26. The method of claim 7, wherein causing the user interface to be presented on the computing device of the consumer includes causing population of dynamic information fields of the user interface with a purchase history and promotional information associated with the plurality of promotions such that the user interface presents the purchase history and the plurality of promotions according to corresponding providers in a manner that allows the consumer to identify purchase patterns with respect to the plurality of providers and in a manner that allows the consumer to select one or more of the plurality of promotions.

27. The non-transitory machine-readable storage medium of claim 25, wherein the operations further comprise:
receiving, from the computing device of the user in response to redemption of the promotion by the user, subsequent transaction data related to purchases determined to be made by the user with respect to the particular provider subsequent to redemption of the promotion; and determining a subsequent promotion that is associated with the particular provider and that is based on a level of customer loyalty determined with respect to the particular provider based on the subsequent transaction data.

* * * * *